US008663497B2

(12) United States Patent
Matsumoto et al.

(10) Patent No.: US 8,663,497 B2
(45) Date of Patent: Mar. 4, 2014

(54) LIQUID CRYSTAL COMPOSITION COMPRISING POLYMERIZABLE COMPOUND, AND LIQUID CRYSTAL DISPLAY ELEMENT USING SAID LIQUID CRYSTAL COMPOSITION

(75) Inventors: Ken Matsumoto, Tokyo (JP); Masatomi Irisawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/502,486

(22) PCT Filed: Oct. 19, 2010

(86) PCT No.: PCT/JP2010/068329
§ 371 (c)(1),
(2), (4) Date: Apr. 17, 2012

(87) PCT Pub. No.: WO2011/062017
PCT Pub. Date: May 26, 2011

(65) Prior Publication Data
US 2012/0200794 A1    Aug. 9, 2012

(30) Foreign Application Priority Data
Nov. 18, 2009   (JP) .................................. 2009-263173

(51) Int. Cl.
| C09K 19/52 | (2006.01) |
| C09K 19/06 | (2006.01) |
| C09K 19/32 | (2006.01) |
| C09K 19/30 | (2006.01) |
| C09K 19/12 | (2006.01) |
| C09K 19/00 | (2006.01) |
| C09K 19/02 | (2006.01) |

(52) U.S. Cl.
USPC .............. 252/299.01; 252/299.6; 252/299.61; 252/299.62; 252/299.63; 252/299.66; 252/299.65; 252/299.67; 428/1.1; 428/1.3; 349/86; 349/182

(58) Field of Classification Search
USPC ............... 252/299.01, 299.6, 299.62, 299.63, 252/299.65, 299.66, 299.67; 428/1.1, 1.3; 349/86, 182
See application file for complete search history.

(56) References Cited

U.S. PATENT DOCUMENTS

| 5,279,764 A | 1/1994 | Reiffenrath et al. |
| 5,384,065 A | 1/1995 | Geelhaar et al. |
| 6,692,657 B1 | 2/2004 | Kato et al. |
| 7,771,616 B2 | 8/2010 | Irisawa et al. |
| 7,807,068 B2 | 10/2010 | Bremer et al. |
| 7,919,009 B2 * | 4/2011 | Itano et al. ................. 252/299.6 |
| 8,057,701 B2 | 11/2011 | Shinano et al. |
| 2005/0116200 A1 | 6/2005 | Nakanishi et al. |
| 2008/0090026 A1 | 4/2008 | Bernatz et al. |
| 2009/0137761 A1 | 5/2009 | Irisawa et al. |
| 2009/0141215 A1 | 6/2009 | Bremer et al. |
| 2011/0037025 A1 | 2/2011 | Shinano et al. |

FOREIGN PATENT DOCUMENTS

| JP | 2811342 | 10/1998 |
| JP | 2003-307720 | 10/2003 |
| JP | 2004-182949 | 7/2004 |
| JP | 2004-277488 | 10/2004 |
| JP | 2005-048007 | 2/2005 |
| JP | 2006-502264 | 1/2006 |
| JP | 2006-215184 | 8/2006 |
| JP | 2007-23071 | 2/2007 |
| JP | 2007-119415 | 5/2007 |
| JP | 2008-116931 | 5/2008 |
| JP | 2008-239913 | 10/2008 |
| JP | 2009-132718 | 6/2009 |
| WO | 2009030322 | 3/2009 |
| WO | 2009104468 | 8/2009 |
| WO | WO 2009/122868 | 10/2009 |

OTHER PUBLICATIONS

Norio Koma, Wide Viewing Angle LCD Technology by Vertical Alignment Technology, vol. 3, No. 2, 117 (1999).
Arihiro Takeda, Liquid Crystal Domain Control in MVA-LCD, vol. 3, No. 4, 272 (1999).
International Search Report PCT/JP2010/068329 dated Dec. 21, 2010, with English Translation.
Chinese Office Action dated Mar. 21, 2013 in corresponding Chinese Patent Application No. 201080045322.8.

* cited by examiner

*Primary Examiner* — Geraldina Visconti
(74) *Attorney, Agent, or Firm* — Young & Thompson

(57) ABSTRACT

Disclosed is a liquid crystal composition formed by including a polymerizable compound represented by general formula (I) in a nematic liquid crystal composition with negative dielectric anisotropy ($\Delta\in$). In the formula, ring $C^1$ represents a benzene-1,2,4-triyl group, or the like; rings $C^2$ to $C^4$ represent a 1,4-phenylene group, a naphthalene-2,6-diyl group, or the like; $M^1$ to $M^3$ represent a hydrogen atom or a methyl group; $Z^1$ and $Z^2$ are a direct coupling, $-L^1-$, $-L^1O-$, $-L^1O-CO-$, or the like; $Z^6$ is a direct coupling, $-L^2-$, $-OL^2-$, $-O-COL^2-$, or the like; at least one of $Z^1$, $Z^2$, and $Z^6$ is not a direct coupling; $L^1$ and $L^2$ represent a $C_{1-10}$ alkylene group; $Z^3$ to $Z^5$ represent a direct coupling, an ester bond, or the like; and p, q, and r are 0 or 1, wherein $1 \le p+q+r \le 3$.

20 Claims, No Drawings

LIQUID CRYSTAL COMPOSITION COMPRISING POLYMERIZABLE COMPOUND, AND LIQUID CRYSTAL DISPLAY ELEMENT USING SAID LIQUID CRYSTAL COMPOSITION

TECHNICAL FIELD

The present invention relates to a liquid crystal composition formed by adding a polymerizable compound having a (meth)acryloyl group as a polymerizable group to a particular liquid crystal liquid composition, and an electro-optical display element produced by sandwiching the liquid crystal composition between substrates.

BACKGROUND ART

A large number of liquid crystal display elements utilizing the optical (refractive index) anisotropy ($\Delta n$) (hereinafter, may be simply referred to as "$\Delta n$") or the dielectric anisotropy ($\Delta \in$) (hereinafter, may be simply referred to as "$\Delta \in$"), which are characteristics of a liquid crystal compound, have been hitherto produced. Liquid crystal display elements are widely utilized in timepieces, calculators, various measuring instruments, automotive panels, word processors, electronic schedulers, mobile telephones, printers, computers, television sets and the like. Thus, the demand is also increasing every year. Liquid crystal compounds exhibit an intrinsic liquid crystal phase which is positioned intermediately between the solid phase and the liquid phase, and the phase morphology is broadly classified into a nematic phase, a smectic phase and a cholesteric phase. Among these, the nematic phase is currently most widely used for the use in display elements. Among the systems applied to liquid crystal display elements, representative examples of the display system include a TN (twisted nematic) type, an STN (super-twisted nematic) type, a DS (dynamic scattering) type, a GH (guest host) type, an IPS (in-plane switching) type, an OCB (optically compensated birefringence) type, an ECB (electrically controlled birefringence) type, a VA (vertically aligned) type, a CSH (color super homeotropic) type, or an FLC (ferroelectric liquid crystal) type. As the drive system, a multiplex drive system has become more common than the conventional static drive system, and a simple matrix system, and more recently, an active matrix (AM) system that is driven by a TFT (thin film transistor) or a MIM, have become the mainstream.

Conventionally, as the liquid crystal displays of the AM system, TN type liquid crystal display apparatuses in which a liquid crystal material having positive dielectric anisotropy ($\Delta \in$) is oriented horizontally to the substrate surface, such that the liquid crystal material is twisted 90° between facing substrates, have been the mainstream. However, this TN type has a problem that the viewing angle is narrow, and thus extensive investigations have been conducted to promote a widening of the viewing angle.

As a system that is converted to this TN type, there have been developed the VA type, among others, the MVA type and EVA type as described in Non-Patent Literature 1 or Non-Patent Literature 2, and it has been successful in improving the viewing angle characteristics to a large extent. These are systems in which a liquid crystal material having negative dielectric anisotropy is vertically oriented between two substrates, and the tilt direction of the liquid crystal molecules at the time of voltage application is regulated by the protrusions or slits provided on the surface of the substrates. Recently, as described in Patent Literature 1, liquid crystal display apparatuses in which a liquid crystal material containing a monomer or oligomer that is polymerized by light or heat is encapsulated between substrates, and the polymerizable component is polymerized while the voltage to be applied to the liquid crystal layer is adjusted, thereby having the orientation direction of the liquid crystals determined, have also been suggested. Those apparatuses are called liquid crystal displays of a PS (polymer stabilized) type or a PSA (polymer sustained alignment) type. The technologies of PS(A) improve the trade-off between the light transmittance and the response speed in liquid crystal display apparatuses of an MVA type or the like, and therefore, development of a PSA-VA type (or a PS-VA type) is in progress.

As such, investigations have been conducted on the widening of the viewing angle, and these days, the application of the widening of the viewing angle to large-sized liquid crystal display apparatuses, which are represented by laptop computers, monitors, and television sets, has been made practical. However, those liquid crystal display elements have a drawback that the response speed to an electric field is slow, and there is still a significant demand in connection with the response speed. Especially, an improvement in the speed is demanded in television sets and the like that are used in a moving image display. In order to achieve a high-precision and high-resolution display with liquid crystal display elements, there is a need to develop and use a liquid crystal having a fast response speed.

Furthermore, in the case of driving a liquid crystal display element in a certain frame period, in order to obtain a display with satisfactory contrast, it is desirable that a liquid crystal display element have a high voltage holding ratio (voltage holding ratio during a frame period). Particularly, when energy such as light or heat is applied to a liquid crystal material as described in Patent Literature 1, there is a concern about a decrease in the voltage holding ratio, which results from deterioration of the compound. In regard to such problems, if the energy such as light or heat required to polymerize the polymerizable compound is reduced, deterioration of the compound is suppressed. Therefore, it is desirable that the polymerization reactivity of the polymerizable compound be high.

Further, if the polymerization reactivity of the polymerizable compound is low, the intended effect of acquiring a fast response speed of the liquid crystal display element is reduced. Also, as those unreacted polymerizable compound molecules undergo polymerization at a later time, there is a risk that the voltage-transmittance characteristics may change. Therefore, it is desirable that the polymerizable compound have high polymerization reactivity.

Patent Literature 1 discloses a VA liquid crystal display apparatus with reduced burn-in, and a composition used therein, and Patent Literatures 2 and 3 disclose polymerizable compounds having a trifunctional(meth)acryloyl group introduced as a polymerizable group, but these patent Literatures do not mention on the reactivity. Patent Literature 4 discloses alignment films which provide VA liquid crystal display elements having high voltage holding ratios; however, even if these are used, a satisfactory response speed could not be obtained. Patent Literatures 5 and 6 disclose VA liquid crystal compositions, but there is no description that a polymerizable compound having a (meth)acryloyl group introduced as a polymerizable group is used. Patent Literature 7 discloses a polymerizable compound, but the patent Literature neither describes nor suggests the use of the compound in a liquid crystal composition having negative dielectric anisotropy ($\Delta \in$). Also, there is a problem that a compound having a trifunctional(meth)acryloyl group as a polymerizable group has poor solubility.

In PSA-VA type liquid crystal displays, the polymerizable compound is polymerized while a voltage is applied. That polymer takes the role as protrusions in the MVA type, and regulates the tilt direction of the molecules at the time of voltage application. Therefore, by implementing compartmentalization of the molecular orientation region, the viewing angle can be widened similarly to the MVA type and the like. Also, in the MVA type, the protrusions cause a decrease in the transparency to the incident light, and thus, improvements in the luminance and contrast have been desired. However, in the PSA type, since protrusions are not needed, those characteristics are enhanced, and also, simplification of the production process is made possible. In the PSA type, immobilization of the polymerizable compound is important, and for that purpose, high reactivity is required. However, those polymerizable compounds that are known to date may precipitate out in the liquid crystal composition due to their low solubility, or the polymerizable compounds have problems that the voltage holding ratio decreases, or that the intended effect of making the response speed of the display element fast is small, due to their low reactivity. Also, even if the reactivity of the polymerizable group is high, a VT shift (a change in the behavior of transmittance against voltage) occurs, so that the reliability of the liquid crystal display elements is decreased. Patent Literatures 8 to 10 disclose the technology of PS(A).

CITATION LIST

Patent Literature

Patent Literature 1: Japanese Patent Application Laid-Open (JP-A) No. 2003-307720
Patent Literature 2: JP-A No. 2004-182949
Patent Literature 3: JP-A No. 2004-277488
Patent Literature 4: JP-A No. 2006-215184
Patent Literature 5: JP-A No. 2005-48007
Patent Literature 6: JP-A No. 2007-23071
Patent Literature 7: JP-A No. 2007-119415
Patent Literature 8: JP-A No. 2008-116931
Patent Literature 9: JP-A No. 2009-132718
Patent Literature 10: WO 2009/104468

Non Patent Literature

Non-Patent Literature 1: "Ekisho (Liquid Crystal)", Vol. 3, No. 2, 117 (1999)
Non-Patent Literature 2: "Ekisho (Liquid Crystal)", Vol. 3, No. 4, 272 (1999)

SUMMARY OF INVENTION

Technical Problem

Therefore, an object of the present invention is to provide a liquid crystal composition which provides a liquid crystal display element that is capable of fast response and has high reliability, without having a decrease in the voltage holding ratio after being irradiated with an energy radiation such as ultraviolet radiation.

Solution to Problem

The present invention provides a liquid crystal composition comprising a polymerizable compound represented by the following general formula (I) and a nematic liquid crystal composition having negative dielectric anisotropy ($\Delta\varepsilon$).

[Chemical Formula 1]

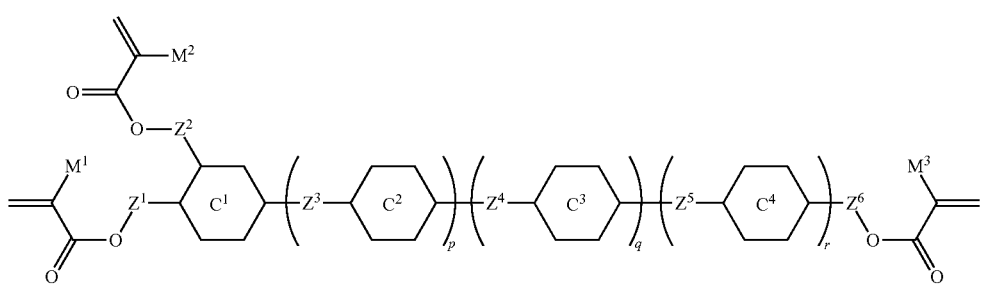

(I)

wherein ring $C^1$ represents a benzene-1,2,4-triyl group, a cyclohexane-1,2,4-triyl group, or a naphthalene-1,2,6-triyl group; rings $C^2$, $C^3$ and $C^4$ each independently represent a 1,4-phenylene group, a 1,4-cyclohexylene group or a naphthalene-2,6-diyl group; at least one hydrogen atom of these rings $C^1$, $C^2$, $C^3$ and $C^4$ may be independently substituted with an alkyl group having 1 to 3 carbon atoms, an alkoxy group having 1 to 3 carbon atoms, an acyl group having 1 to 3 carbon atoms, or a halogen atom, as a substituent;

$M^1$, $M^2$ and $M^3$ each independently represent a hydrogen atom or a methyl group;

$Z^1$ and $Z^2$ each independently represent a direct bond, -$L^1$-, -$L^1$O—, -$L^1$O—CO—, -$L^1$CO—O— or -$L^1$O—CO—O—; $Z^6$ represents a direct bond, -$L^2$-, -O$L^2$-, —O—CO$L^2$-, —CO—O$L^2$- or —O—CO—O$L^2$-; at least any one of $Z^1$, $Z^2$ and $Z^6$ is not a direct bond; $L^1$ and $L^2$ each independently represent an optionally branched alkylene group having 1 to 10 carbon atoms, the alkylene group may be interrupted one to three times with an oxygen atom, and the interruption is achieved such that the oxygen atoms are not adjacent to each other;

$Z^3$, $Z^4$ and $Z^5$ each independently represent a direct bond, an ester bond, an ether bond, an optionally branched, saturated or unsaturated alkylene group having 2 to 8 carbon atoms, or a combination thereof; and p, q and r each independently represent 0 or 1, while $1 \le p+q+r \le 3$.

Advantageous Effects of Invention

The liquid crystal composition of the present invention can provide a liquid crystal display element that does not have a decrease in the voltage holding ratio even when irradiated with an energy radiation such as ultraviolet radiation, and is capable of fast response. Furthermore, when a liquid crystal display element is produced using the liquid crystal composition of the present invention, since the polymer formed by irradiation of an energy radiation cannot easily move about in the liquid crystal composition, the reliability of the liquid crystal display element is enhanced.

DESCRIPTION OF EMBODIMENTS

Hereinafter, preferred embodiments of the present invention will be described in detail.

The liquid crystal composition of the present invention preferably contains the polymerizable compound represented by the general formula (I) in an amount of 0.01 to 3 parts by mass relative to 100 parts by mass of the nematic liquid crystal composition having negative dielectric anisotropy ($\Delta\epsilon$), and more preferably contains the polymerizable compound in an amount of 0.05 to 2 parts by mass relative to 100 parts by mass of the nematic liquid crystal composition. If the content of the polymerizable compound is less than 0.01 parts by mass, there is a risk that the response speed may be slow, and if the content is greater than 3 parts by mass, there is a risk that the solubility may become poor. Furthermore, when the content of the polymerizable compound is 0.05 to 1 part by mass relative to 100 parts by mass of the nematic liquid crystal composition, it is more preferable because the voltage holding ratio is particularly satisfactory.

Examples of the alkyl group having 1 to 3 carbon atoms which may substitute the hydrogen atom of the rings represented by $C^1$, $C^2$ and $C^3$ in the general formula (I), include methyl, ethyl, propyl and isopropyl, examples of the alkoxy group having 1 to 3 carbon atoms include methoxy, ethoxy, propoxy and isopropoxy, and examples of the acyl group having 1 to 3 carbon atoms include formyl, acetyl and propionyl. Examples of the halogen atom which may substitute the hydrogen atoms of the rings represented by $C^1$, $C^2$ and $C^3$ in the general formula (I) include fluorine, chlorine, bromine and iodine.

Furthermore, in order to provide the effect of the present invention more certainly, the rings $C^1$, $C^2$, $C^3$ and $C^4$ are preferably such that the ring $C^1$ represents a benzene-1,2,4-triyl group, and the rings $C^2$, $C^3$ and $C^4$ each independently represent a 1,4-phenylene group or a naphthalene-2,6-diyl group, both of which may be substituted with the substituent above mentioned.

Examples of the optionally branched alkylene group having 1 to 10 carbon atoms represented by $L^1$ and $L^2$ in the general formula (I) include methylene, ethylene, propylene, trimethylene, tetramethylene, butane-1,3-diyl, 2-methylpropane-1,3-diyl, 2-methylbutane-1,3-diyl, pentane-2,4-diyl, pentane-1,4-diyl, 3-methylbutane-1,4-diyl, 2-methylpentane-1,4-diyl, pentamethylene, hexamethylene, heptamethylene, octamethylene, nonamethylene, and decamethylene.

Examples of the direct bond, the ester bond, the ether bond, the optionally branched, saturated or unsaturated alkylene group having 2 to 8 carbon atoms and the combination thereof represented by $Z^3$, $Z^4$ and $Z^5$ in the general formula (I), include —CO—O—, —O—CO—, —O—CO—O—, —(CH$_2$)$_a$—, —(CH$_2$)$_a$—O—, —O—(CH$_2$)$_a$—, —O—(CH$_2$)$_a$—O—, —(CH$_2$)$_a$—O—CO—, —CO—O—(CH$_2$)$_a$—, —(CH$_2$)$_a$—CO—O—, —O—CO—(CH$_2$)$_a$—, —(CH$_2$)$_a$—O—CO—O—, —O—CO—O—(CH$_2$)$_a$—, —O—(CH$_2$)$_a$—O—CO—, —CO—O—(CH$_2$)$_a$—O—, —O—(CH$_2$)$_a$—CO—O—, —O—CO—(CH$_2$)$_a$—O—, —O—(CH$_2$)$_a$—O—CO—O—, —O—CO—O—(CH$_2$)$_a$—O—, —(CH$_2$CH$_2$O)$_b$—, or —(OCH$_2$CH$_2$)$_b$—. The symbol a represents an integer from 2 to 8, and the symbol b represents an integer from 1 to 3.

In regard to the liquid crystal composition of the present invention, preferred as the polymerizable compound are a polymerizable compound in which, in the general formula (I), either $Z^1$ and $Z^2$ are groups different from $Z^6$, or $L^1$ and $L^2$ are groups different from each other; a polymerizable compound in which one or two of $Z^1$, $Z^2$ and $Z^6$ each represent a direct bond; a polymerizable compound in which p+q+r is 1 or 2; a polymerizable compound in which $Z^3$, $Z^4$ and $Z^5$ each represent an ester bond; a polymerizable compound in which $L^1$ or $L^2$ represents an alkylene group having 2 to 8 carbon atoms; and a polymerizable compound in which one or more hydrogen atoms of the ring $C^1$, ring $C^2$, ring $C^3$ and ring $C^4$ are independently substituted with an alkyl group having 1 to 3 carbon atoms, an alkoxy group having 1 to 3 carbon atoms, an acyl group having 1 to 3 carbon atoms, or a halogen atom, because these compounds have good solubility in the nematic liquid crystal composition. Among these, particularly preferred compounds are a polymerizable compound in which either $Z^1$ and $Z^2$ are groups different from $Z^6$, or $L^1$ and $L^2$ are groups different from each other; and a polymerizable compound in which $Z^3$, $Z^4$ and $Z^5$ each represent an ester bond.

Furthermore, when the polymerizable compound in which p+q+r in the general formula (I) is 1 or 2; or the polymerizable compound in which $M^1$, $M^2$ and $M^3$ each represent a methyl group is used, it is more preferable because the liquid crystal composition exhibits particularly excellent reliability.

Specific examples of the polymerizable compound represented by the general formula (I) include compounds having the structures shown below. However, the present invention is not intended to be limited to the following compounds.

[Chemical Formula 2]
Polymerizable compound No.1
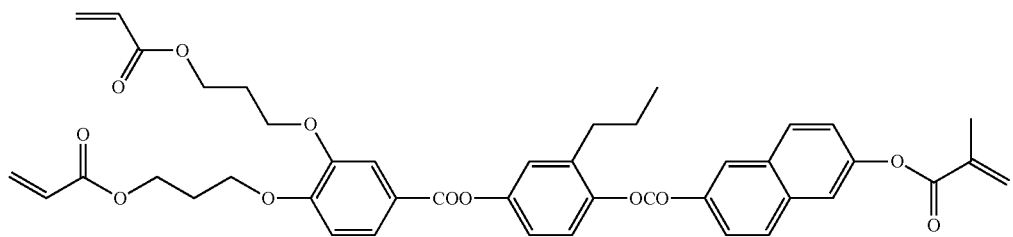
Polymerizable compound No.2
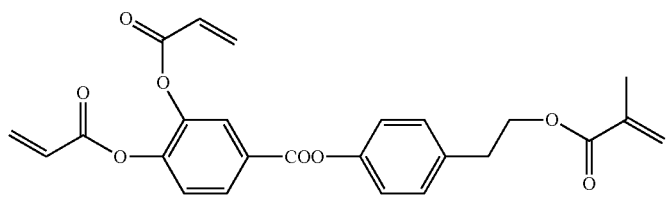
Polymerizable compound No.3
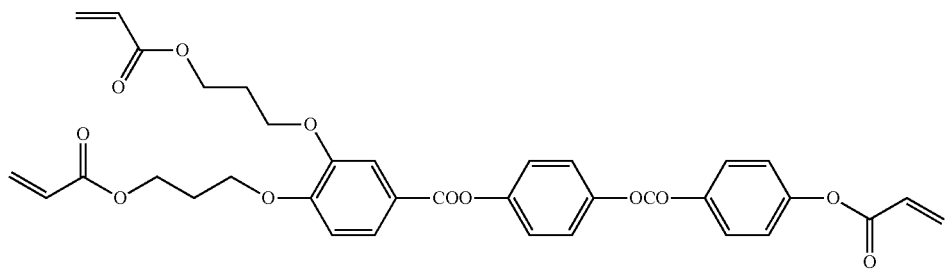
Polymerizable compound No.4
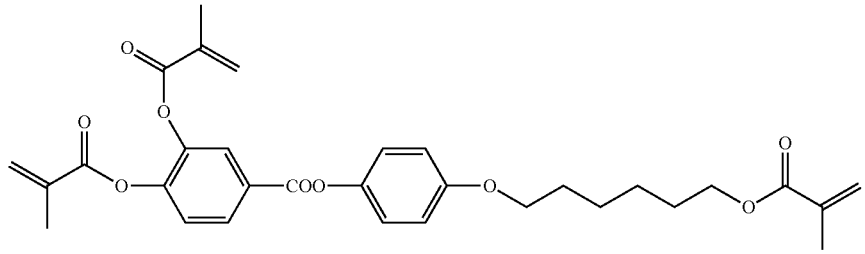
[Chemical Formula 3]
Polymerizable compound No.5
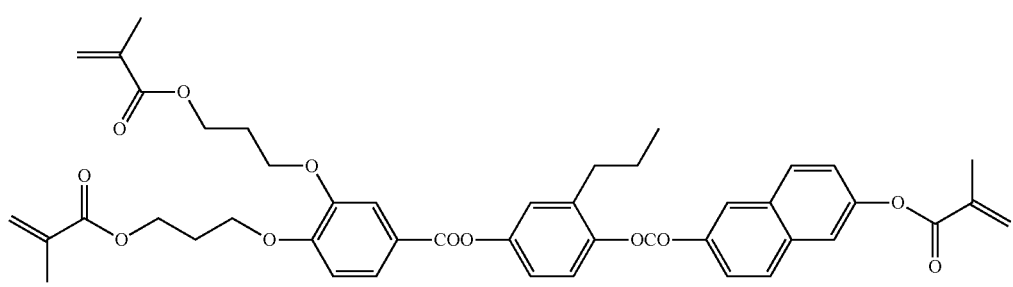
Polymerizable compound No.6
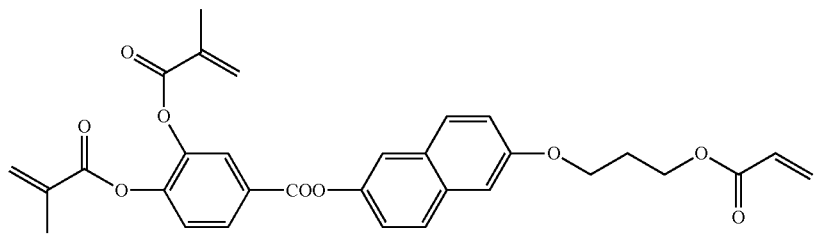

-continued
Polymerizable compound No.7
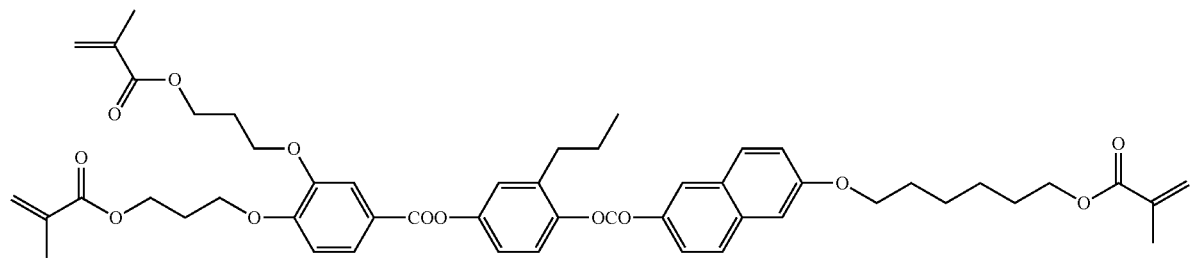
Polymerizable compound No.8
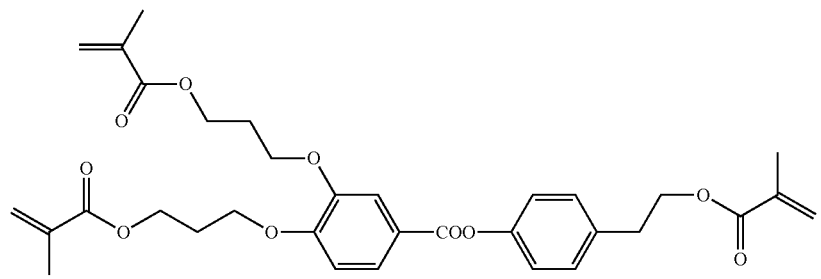
Polymerizable compound No.9
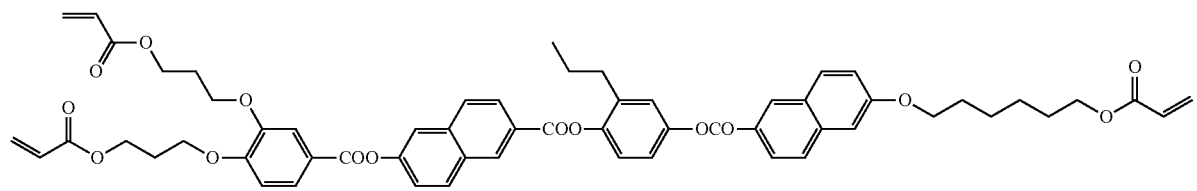
Polymerizable compound No.10
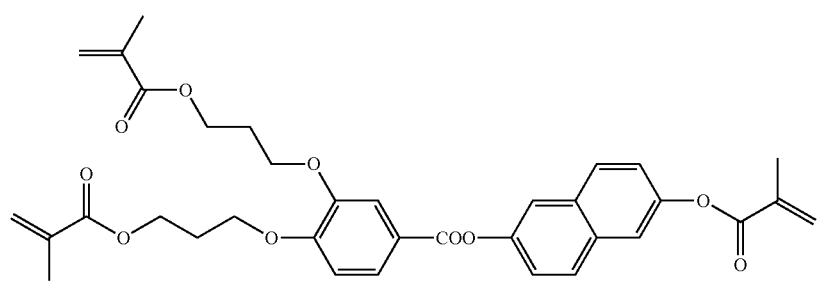
[Chemical Formula 4]
Polymerizable compound No.11
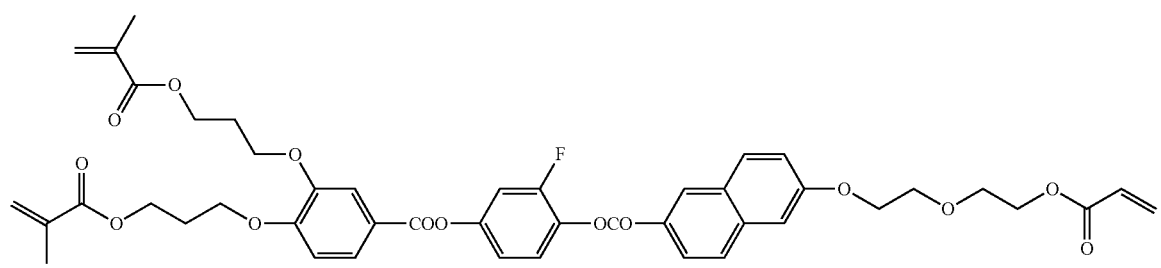

-continued
Polymerizable compound No.12
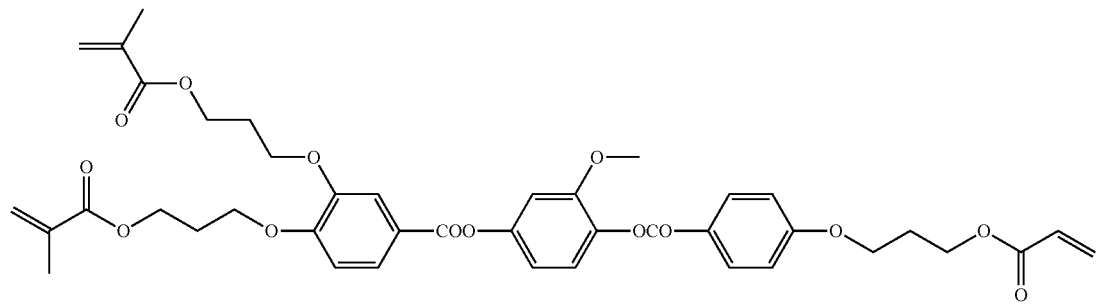
Polymerizable compound No.13
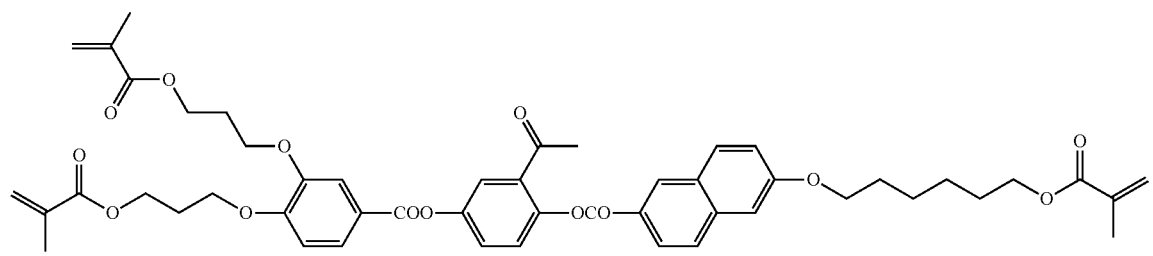
Polymerizable compound No.14
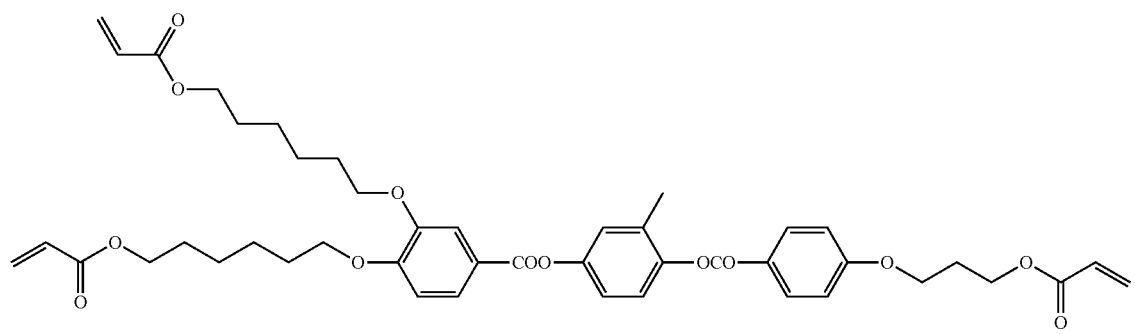
Polymerizable compound No.15
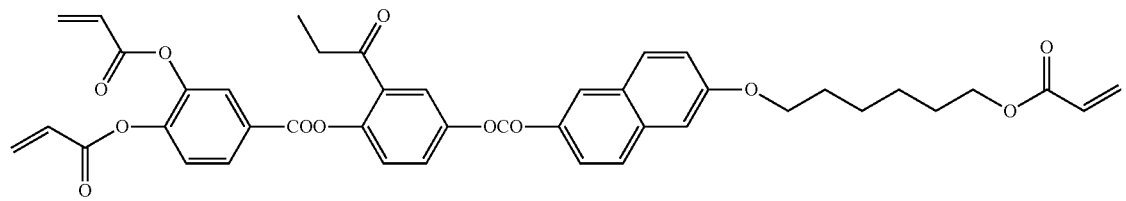
[Chemical Formula 5]
Polymerizable compound No.16
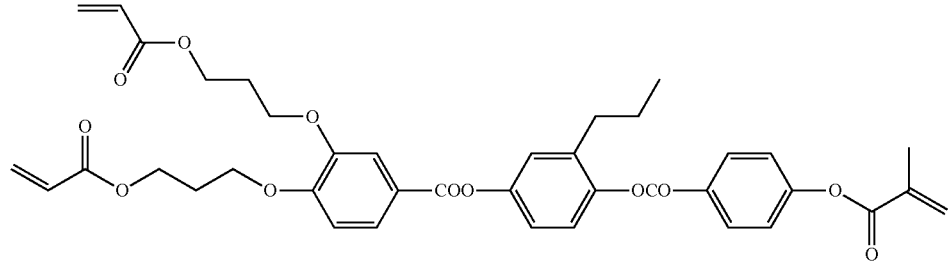

-continued
Polymerizable compound No.17
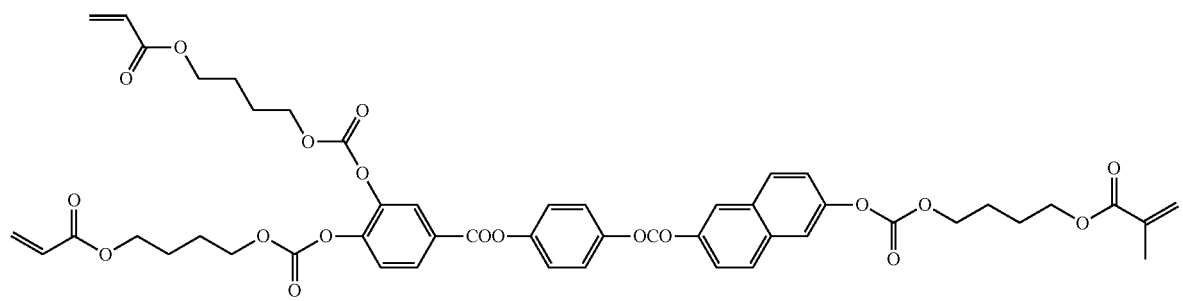
Polymerizable compound No.18
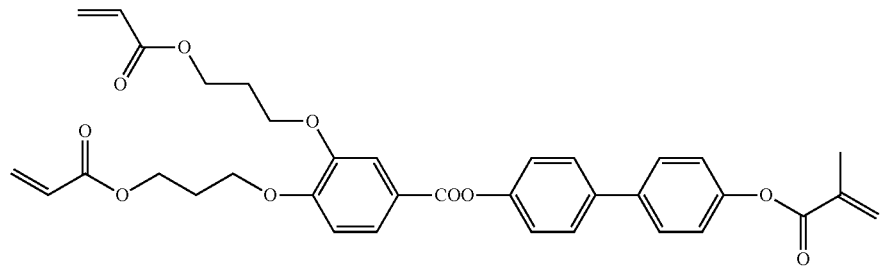
Polymerizable compound No.19
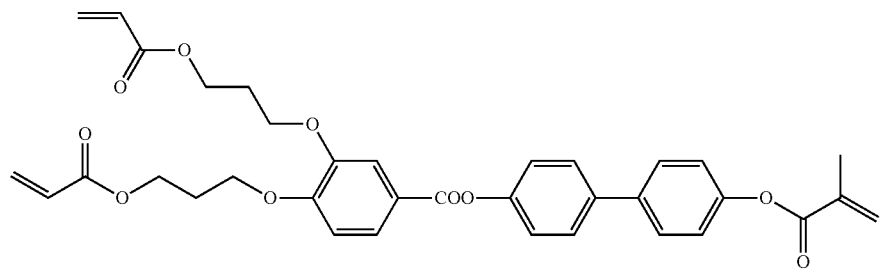
Polymerizable compound No.20
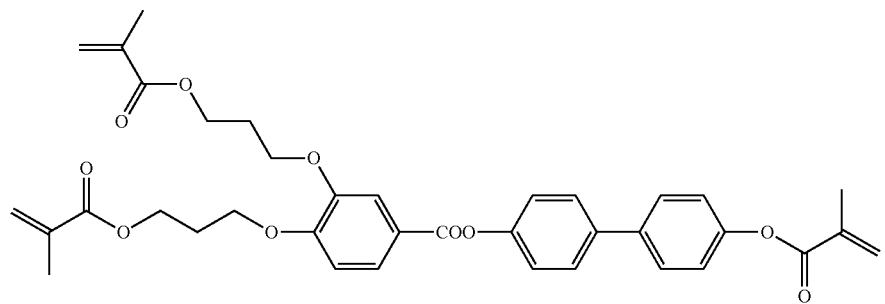
[Chemical Formula 6]
Polymerizable compound No.21
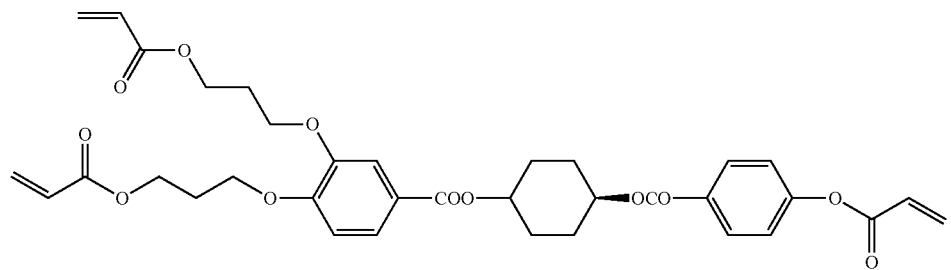

-continued
Polymerizable compound No.22
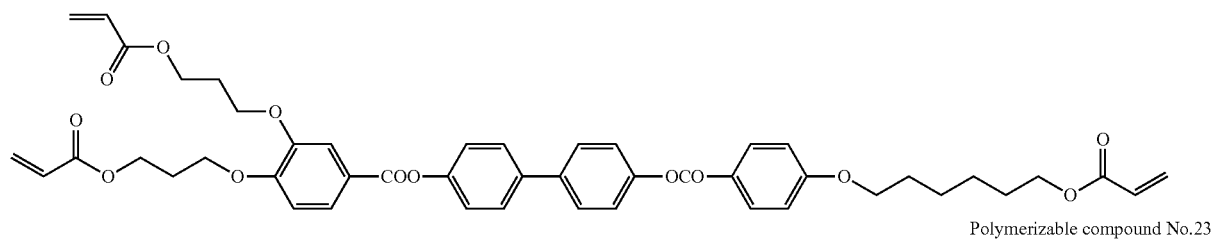
Polymerizable compound No.23
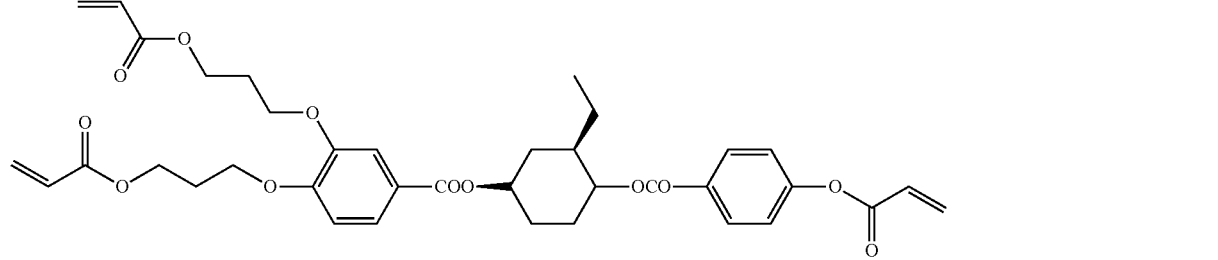
Polymerizable compound No.24
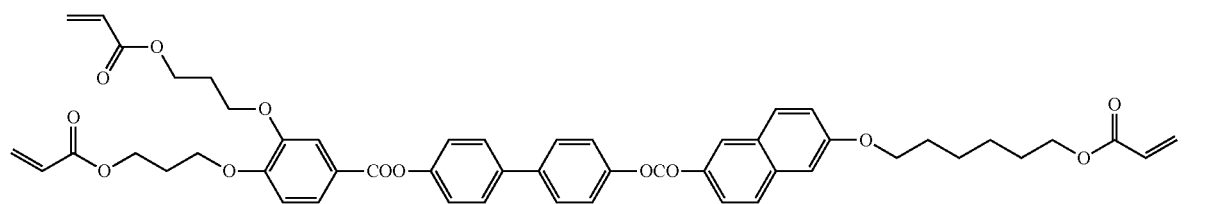
Polymerizable compound No.25
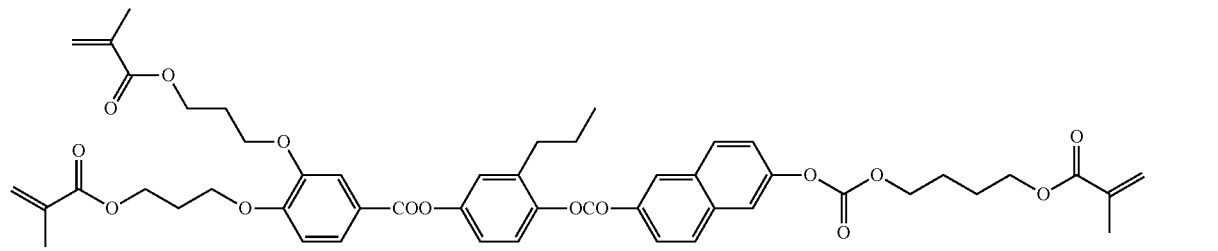
Polymerizable compound No.26
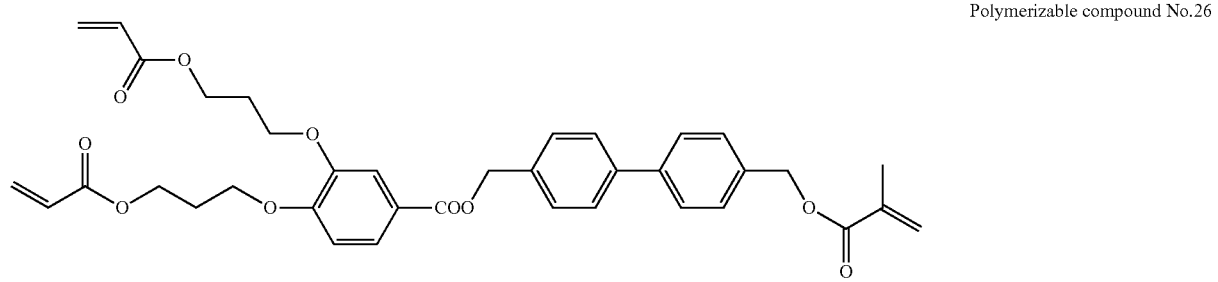
[Chemical Formula 7]
Polymerizable compound No.27
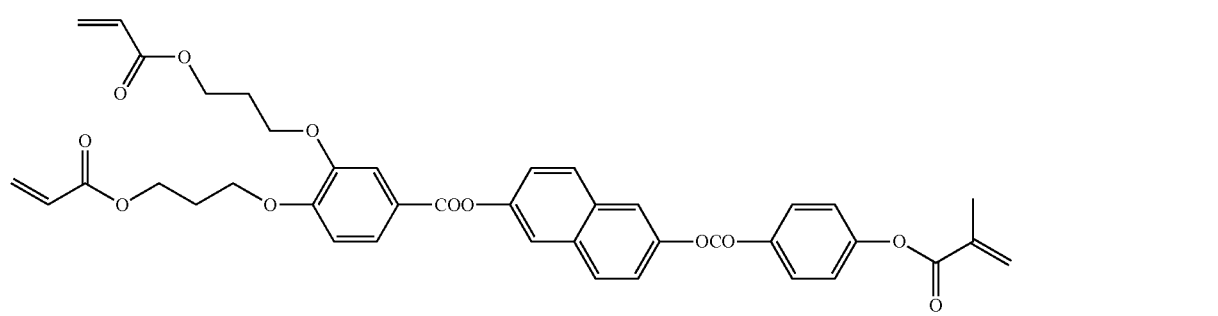

-continued

Polymerizable compound No.28

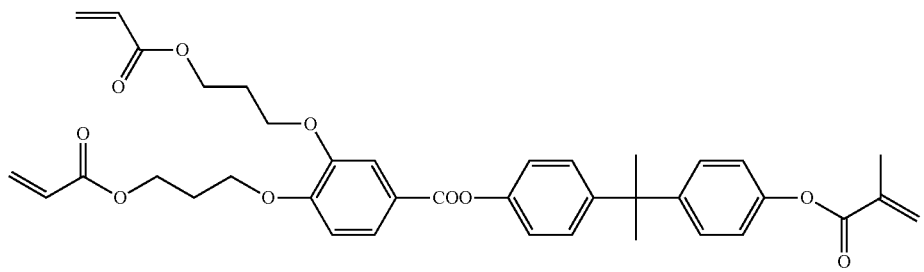

In regard to the polymerizable compound represented by the general formula (I), there are no particular limitations on the method for synthesis thereof, and the polymerizable compound can be synthesized by any conventionally known reaction.

In the liquid crystal composition of the present invention containing the polymerizable compound described above, as the compound having a polymerizable functional group, a bifunctional compound can be used in addition to the trifunctional compound represented by the general formula (I). As the bifunctional compound, those generally used compounds can be used, and its examples include, but are not particularly limited to, the compounds disclosed in paragraphs [0172] to [0314] of JP-A No. 2005-15473, and compounds shown below. The bifunctional compound can be contained in an amount of 0% to 95% by mass, preferably 0% to 70% by mass, and more preferably 0% to 50% by mass, relative to the amount of the trifunctional compound represented by the general formula (I). However, if the bifunctional compound is contained in an amount of 95% by mass or more, it is not preferable because the reactivity of the polymerizable compound may deteriorate.

[Chemical Formula 8]

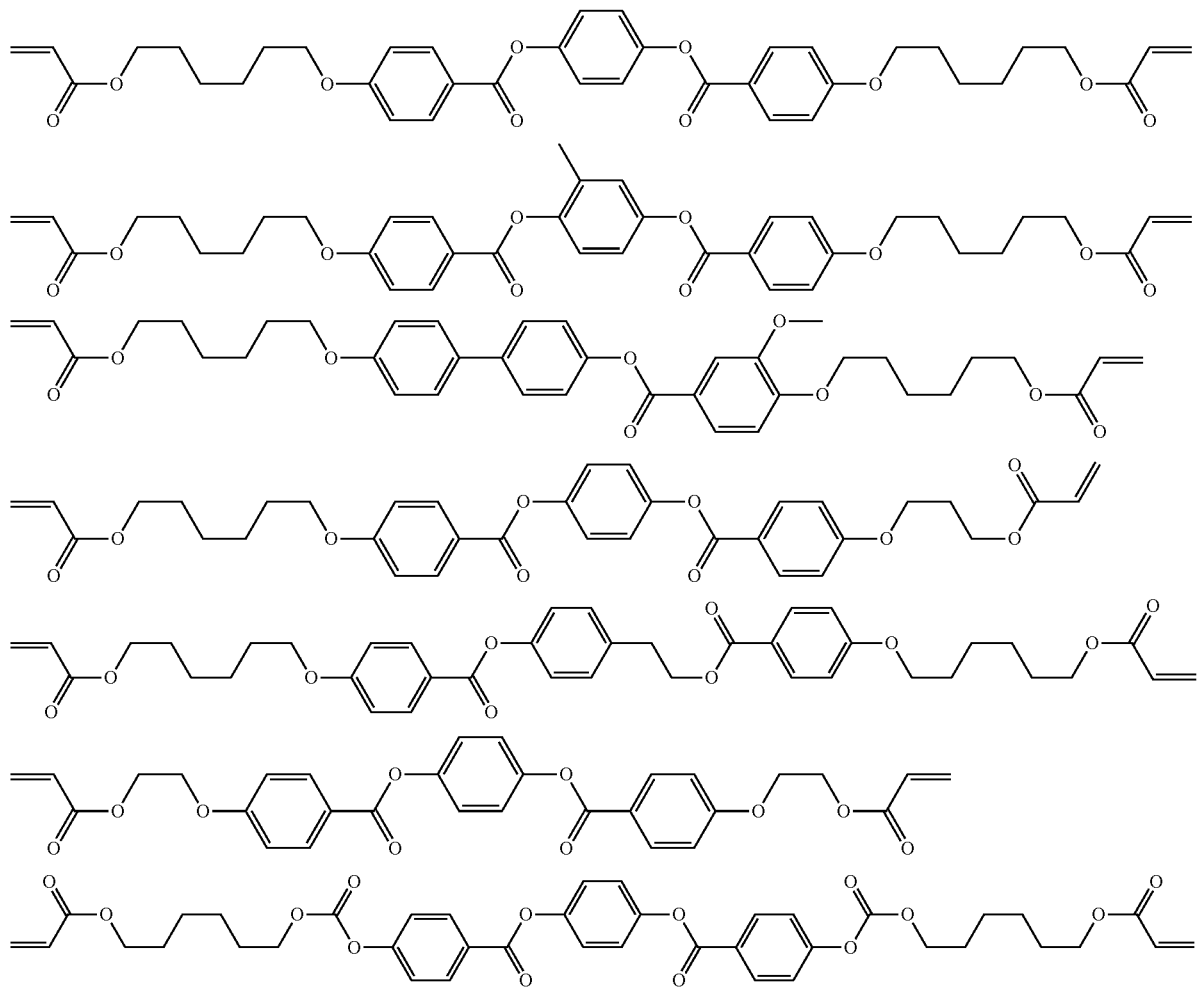

-continued
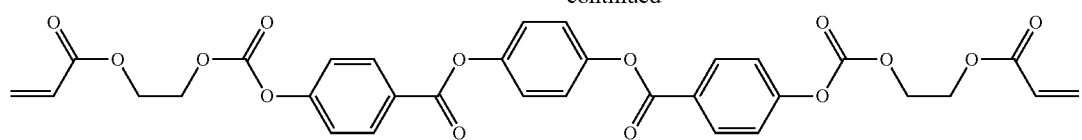
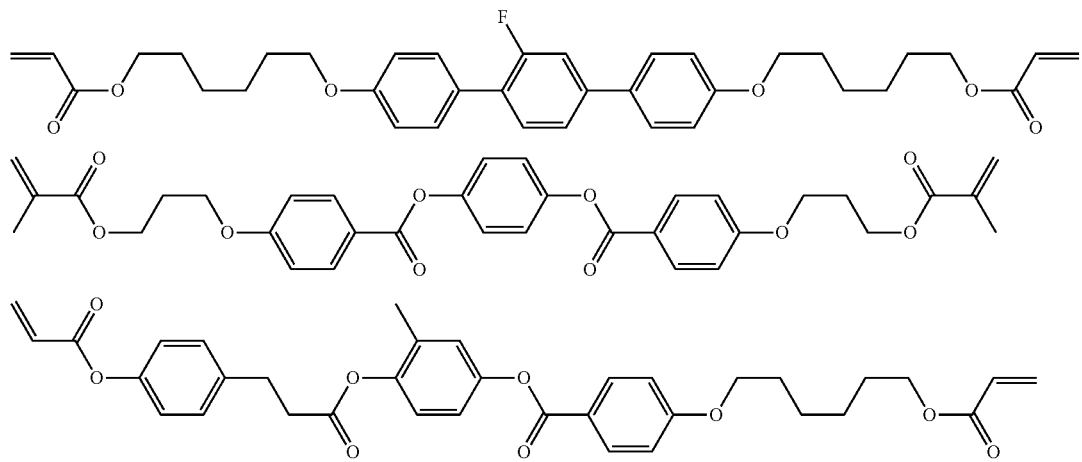
[Chemical Formula 9]
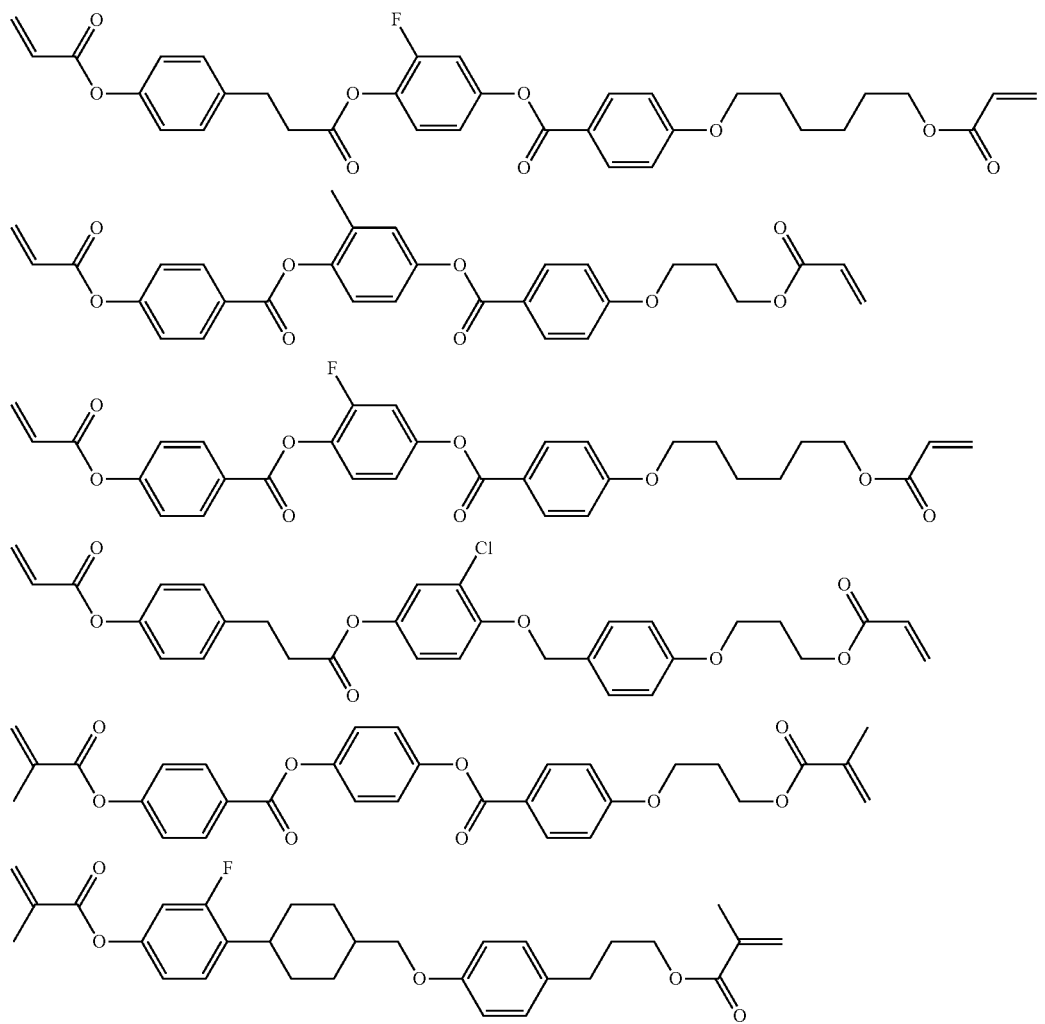

-continued
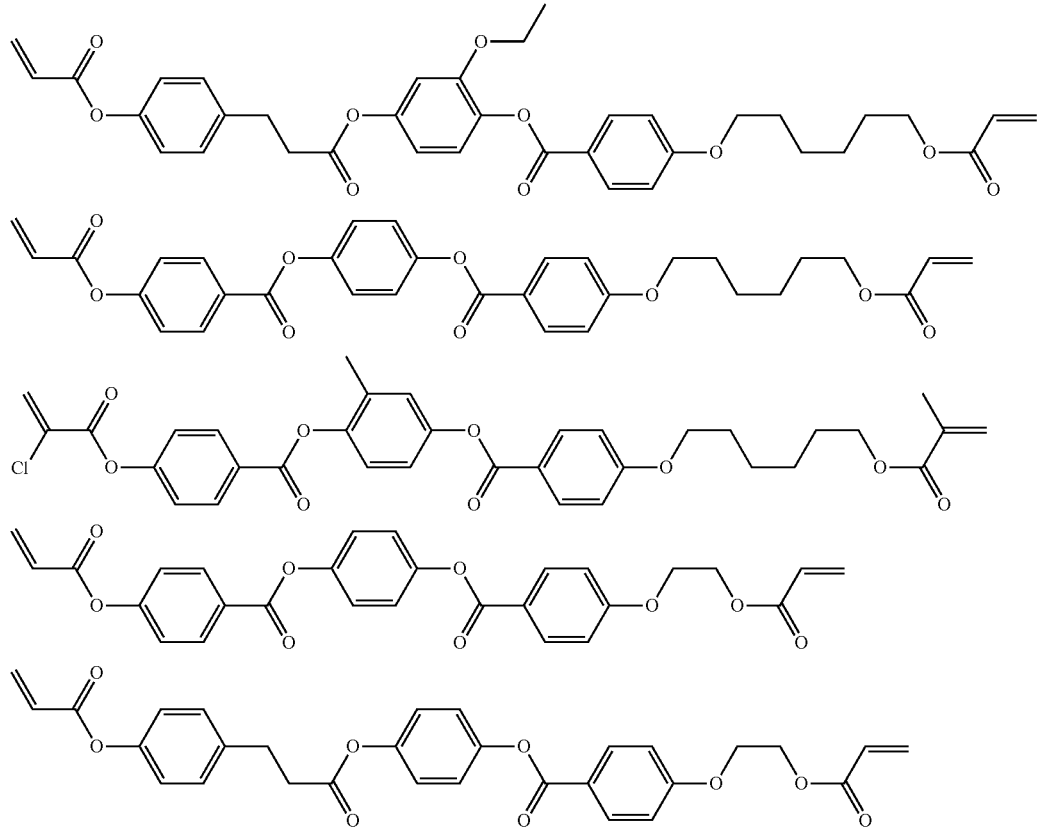
[Chemical Formula 10]
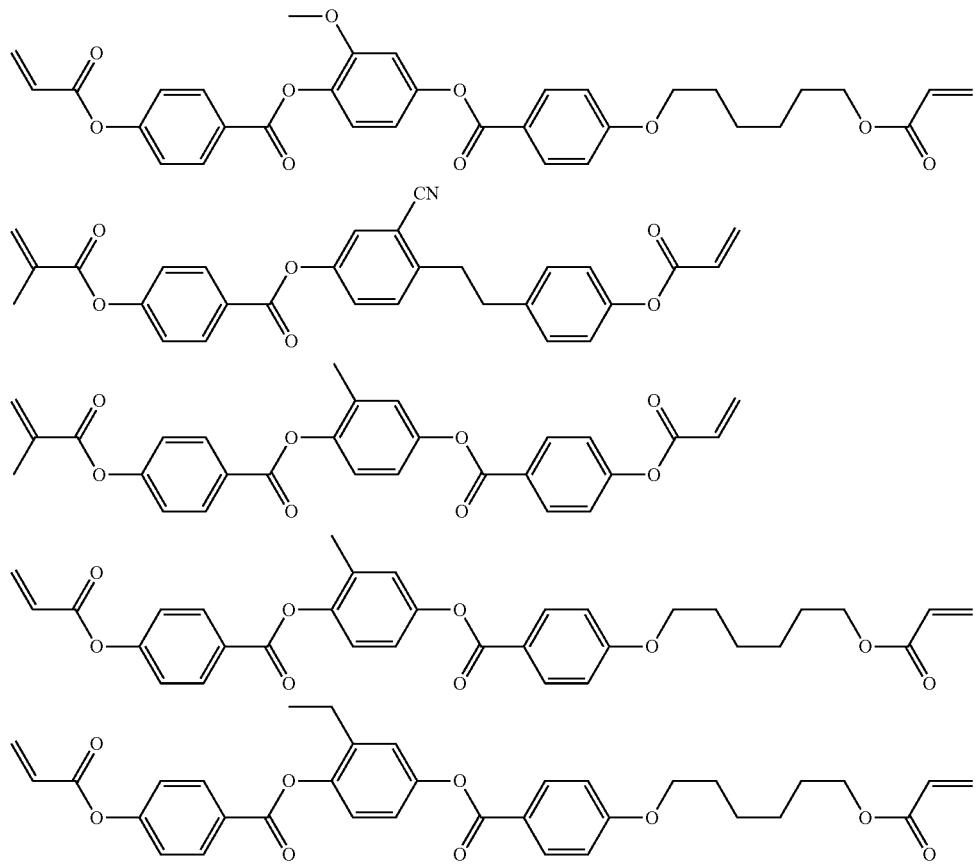

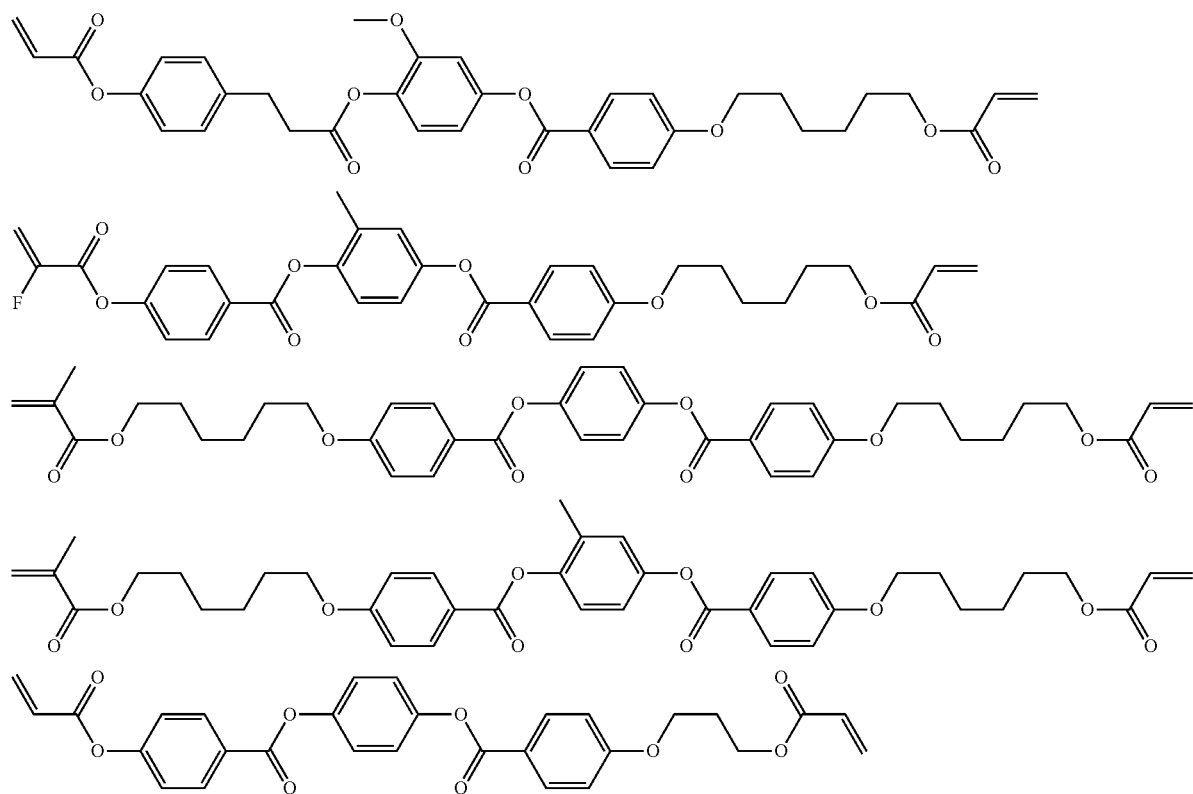
[Chemical Formula 11]
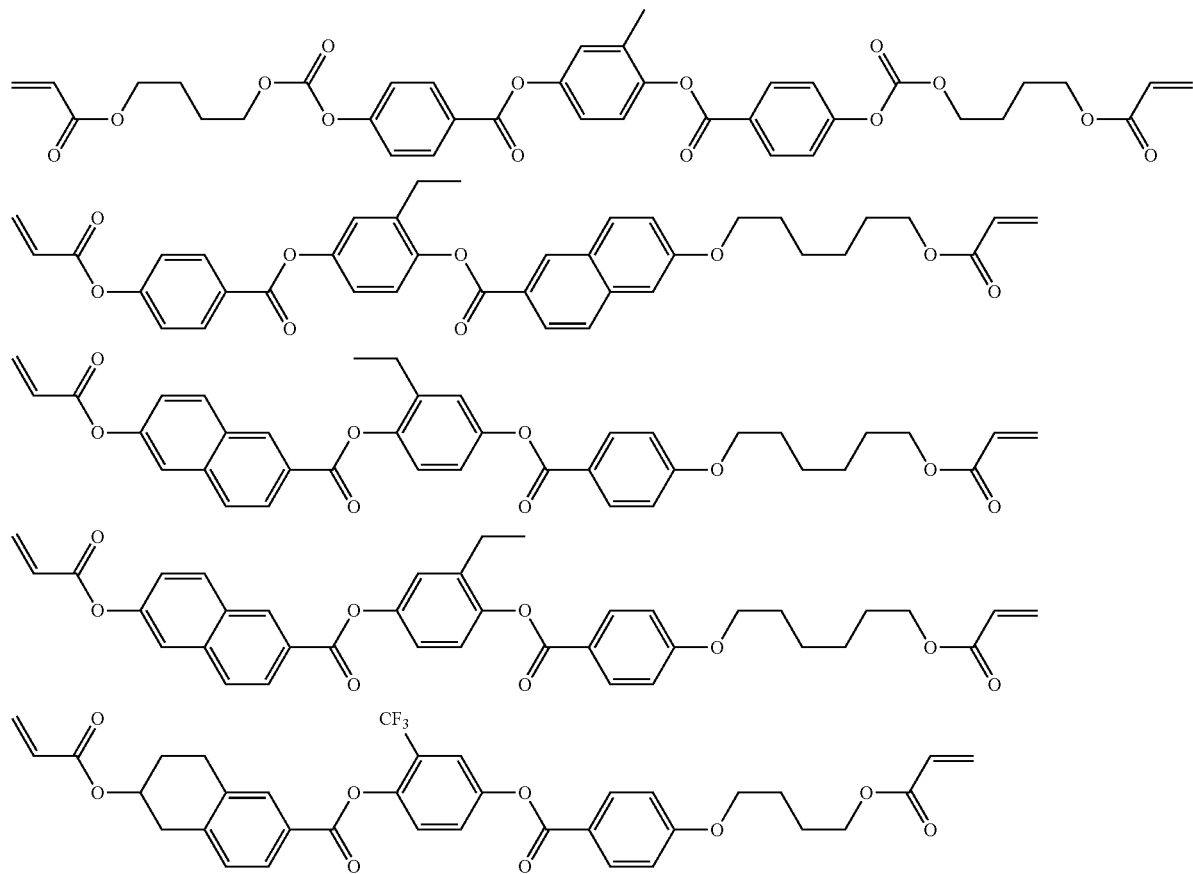

-continued
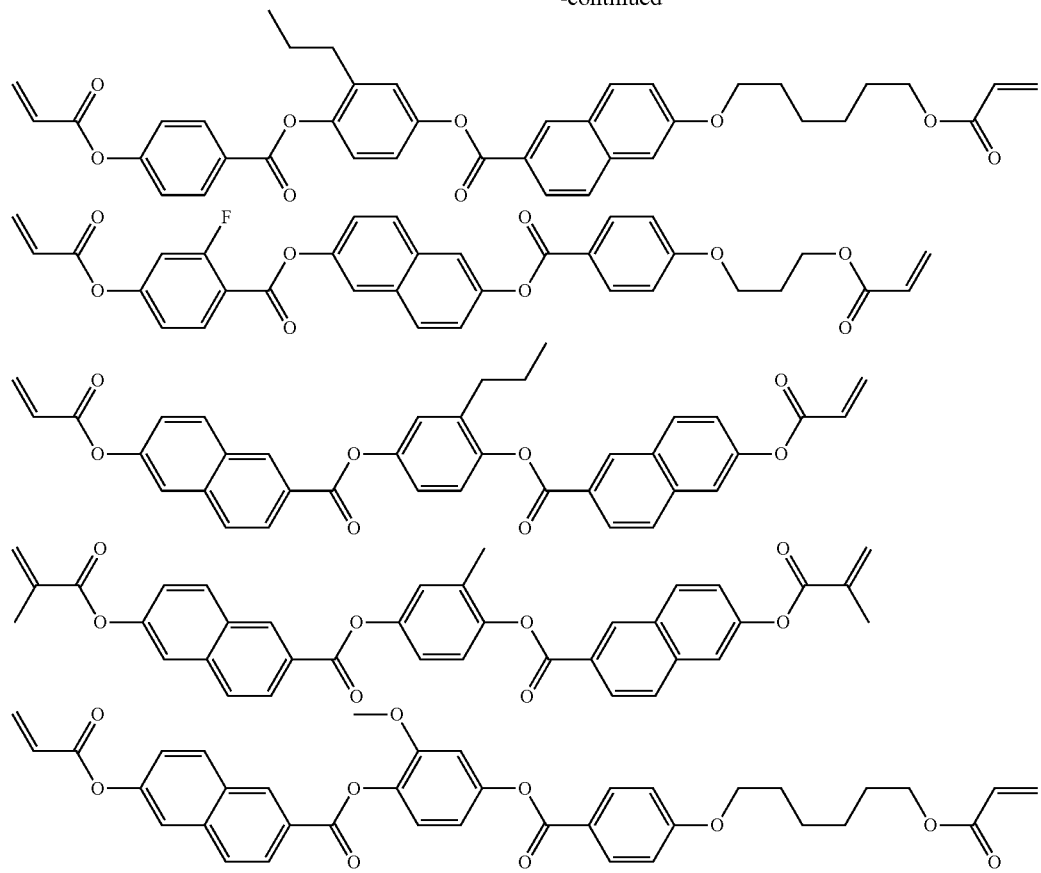
[Chemical Formula 12]
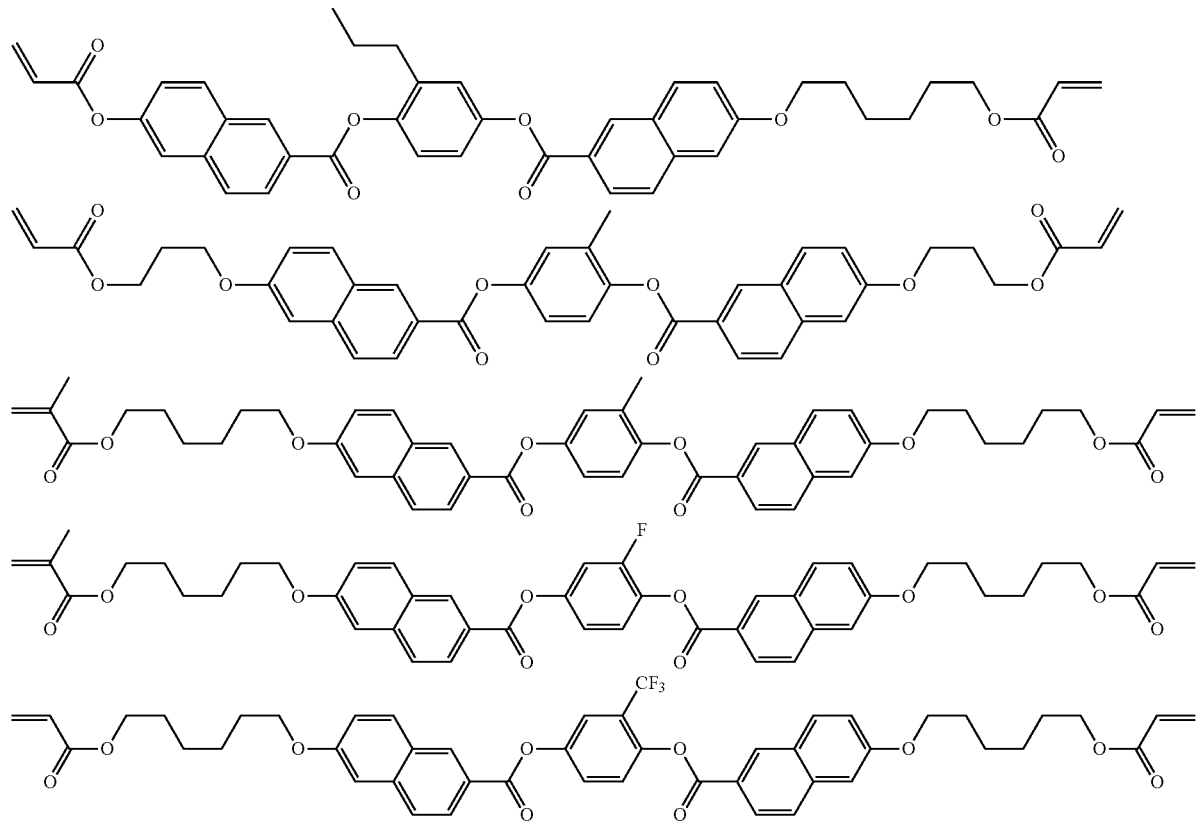

-continued
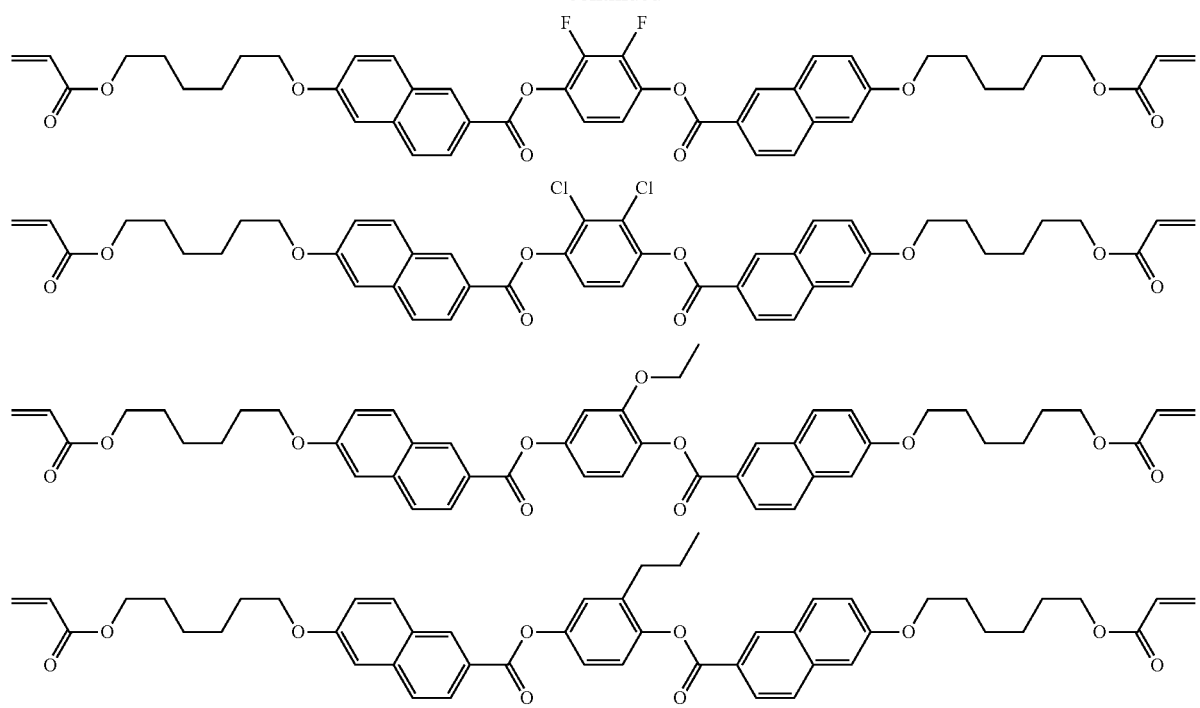
[Chemical Formula 13]
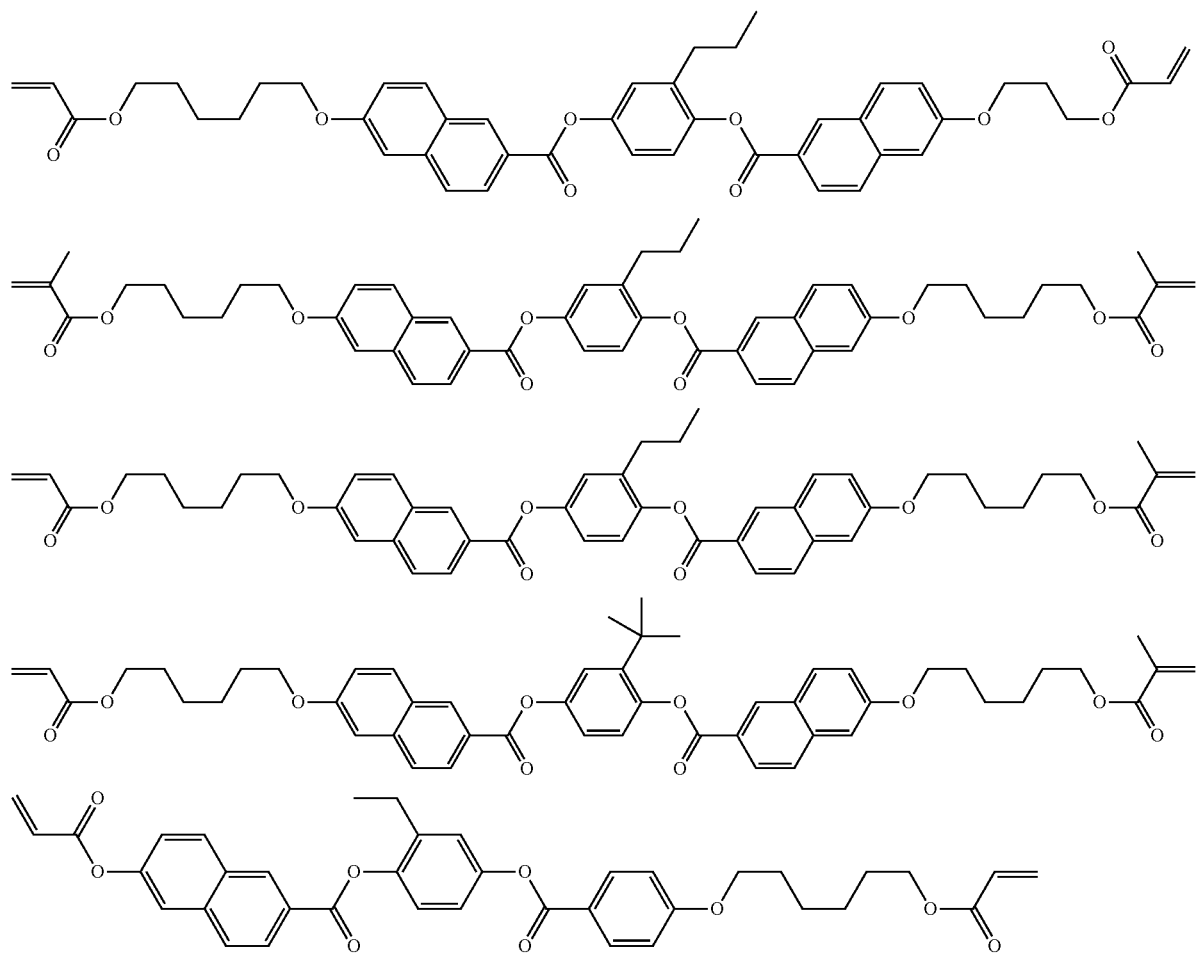

-continued
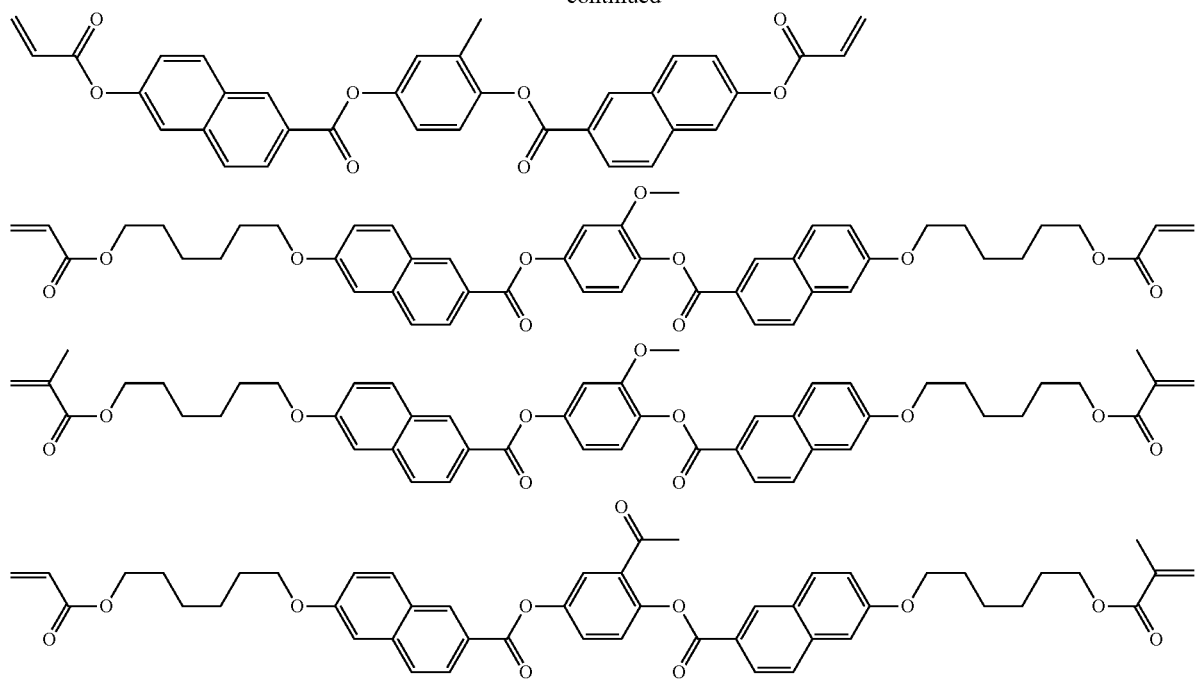
[Chemical Formula 14]
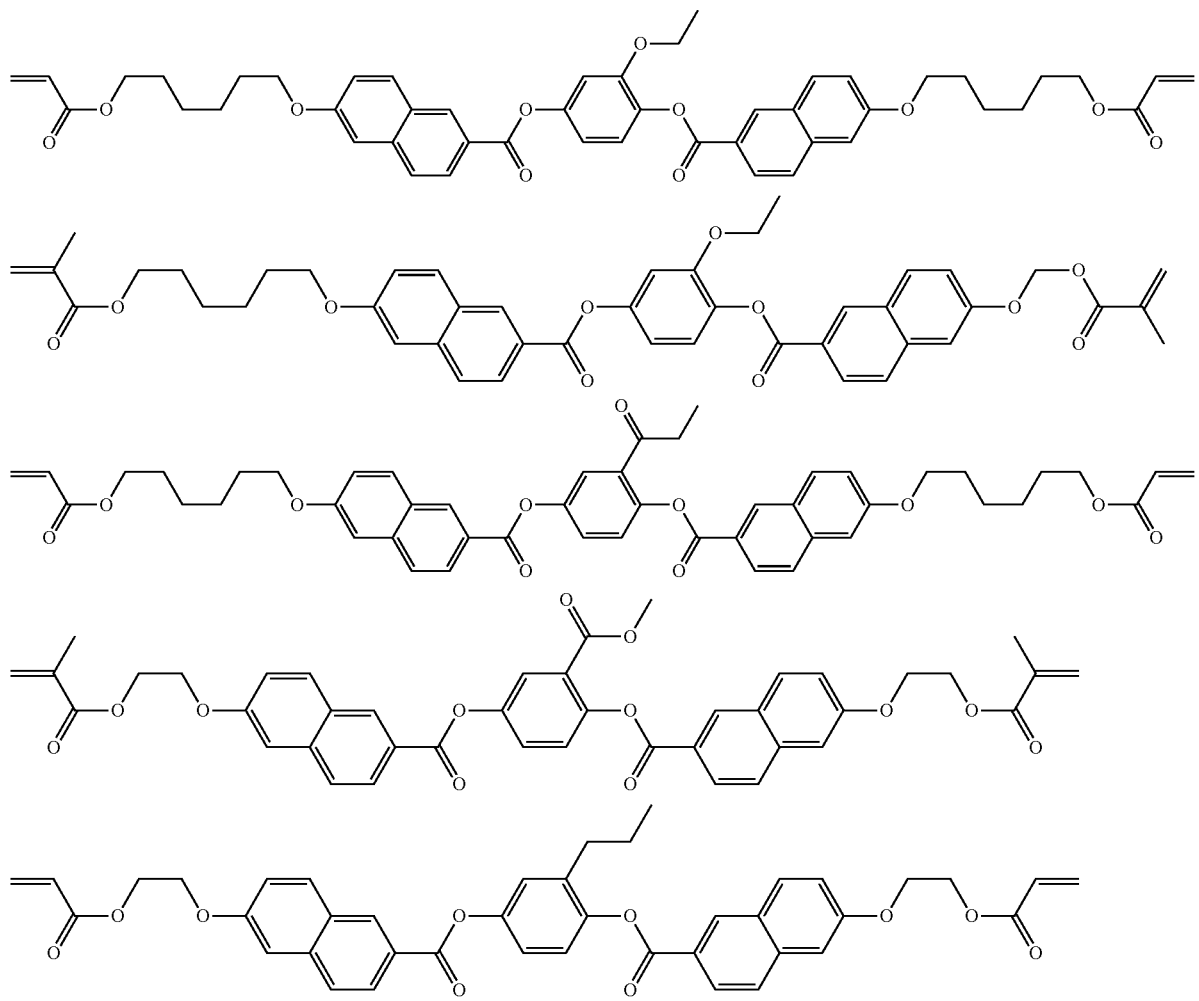

-continued
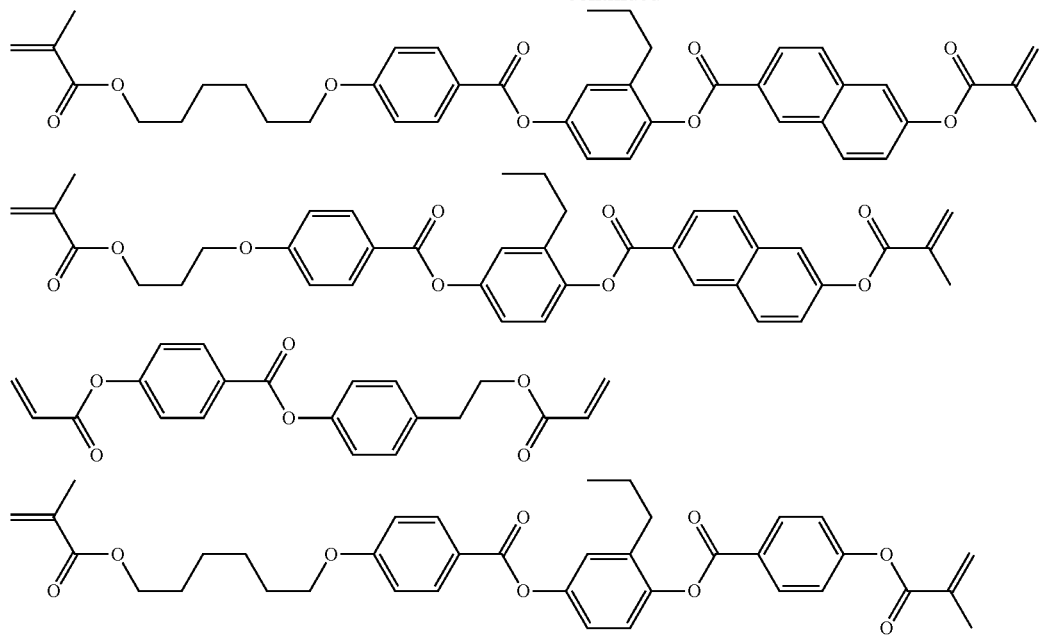
[Chemical Formula 15]
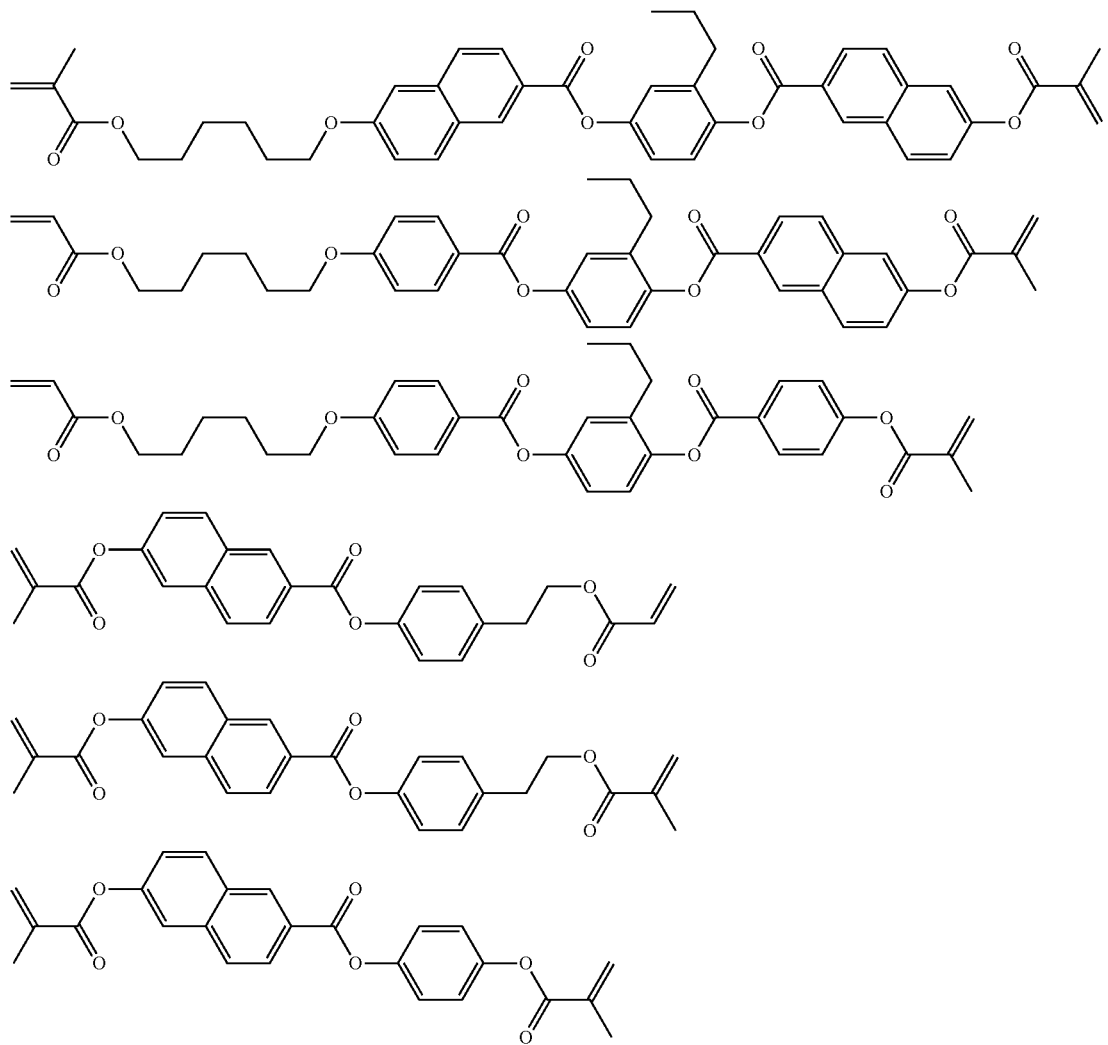

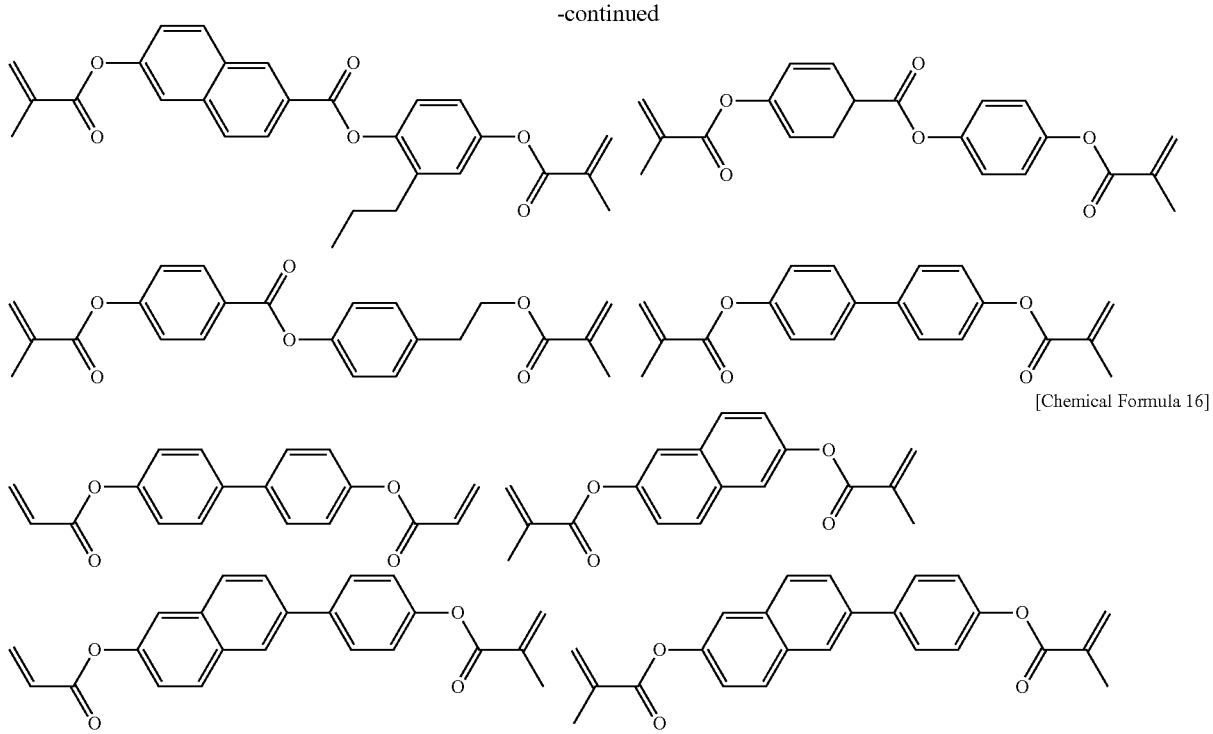

[Chemical Formula 16]

As the nematic liquid crystal composition having negative dielectric anisotropy (Δ∈) used in the present invention, may be prepared using any appropriate known liquid crystal compound so as to exhibit negative dielectric anisotropy (Δ∈). However, a nematic liquid crystal composition containing a liquid crystal compound represented by the following general formula (II), particularly in an amount of 30% to 100% by mass, is preferred because the liquid crystal composition exhibits particularly excellent liquid crystal display characteristics. The liquid crystal compound represented by the following general formula (II) may be used either singly or as a combination of two or more thereof.

$Y^1$, $Y^2$ and $Y^3$ each independently represent a direct bond, —$CH_2$—$CH_2$—, —$CF_2$—$CF_2$—, —CH=CH—, —CF=CF—, —$CH_2$—O—, —O—$CH_2$—, —$CF_2$—O—, —O—$CF_2$—, —$CH_2$—S—, —S—$CH_2$—, —$CF_2$—S—, —S—$CF_2$—, —O—$CF_2$—$C_2H_4$—, —$C_2H_4$—$CF_2$—O—, —CO—O—, —O—CO—, —$CH_2$—$CH_2$—CO—O—, —O—CO—$CH_2$—$CH_2$— or —C≡C—;

$R^3$ and $R^4$ each independently represent an alkyl group having 1 to 6 carbon atoms, or an alkenyl group having 2 to 6 carbon atoms;

j, k and m each independently represent 0 or 1, while j+k+m≥1; and n represents 0 or 1.

[Chemical Formula 17]

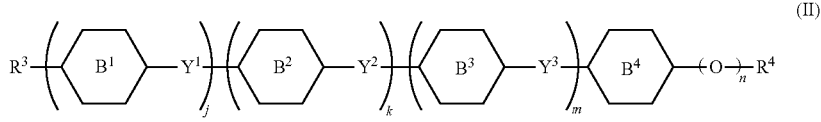

(II)

wherein rings $B^1$, $B^2$, $B^3$ and $B^4$ each independently represent a 1,4-phenylene group, a 1,4-cyclohexylene group, a 1,4-cyclohexelene group, a naphthalene-2,6-diyl group, a decahydronaphthalene-2,6-diyl group, a tetrahydronaphthalene-2,6-diyl group or a 2,5-indanylene ring; at least one hydrogen atom of these rings may be independently substituted with an alkyl group having 1 to 3 carbon atoms, an alkoxy group having 1 to 3 carbon atoms, a chlorine atom or a fluorine atom; —CH= in these rings may be substituted with —N=; —$CH_2$— in these rings may be substituted with —S—, —N= or —O—; two or more hydrogen atoms of at least one of the rings $B^3$ and $B^4$ are substituted by substitutes which may be the same or different and are selected from chlorine, fluorine, —$CF_3$—, —$OCF_3$, and —$OCF_2H$;

Examples of the alkyl group having 1 to 3 carbon atoms and the alkoxy group having 1 to 3 carbon atoms, which may substitute at least one hydrogen atom of the rings represented by $B^1$, $B^2$, $B^3$ and $B^4$ in the general formula (II), include those mentioned as examples of the alkyl group having 1 to 3 carbon atoms and the alkoxy group having 1 to 3 carbon atoms, which may substitute the hydrogen atom of the rings represented by $C^1$, $C^2$, $C^3$ and $C^4$ in the general formula (I).

Examples of the alkyl group having 1 to 6 carbon atoms represented by $R^3$ and $R^4$ in the general formula (II) include methyl, ethyl, propyl, isopropyl, butyl, s-butyl, t-butyl, isobutyl, amyl, isoamyl, t-amyl, hexyl, 2-hexyl, and 3-hexyl. Examples of the alkenyl group having 2 to 6 carbon atoms represented by $R^3$ and $R^4$ in the general formula (II) include vinyl, 1-methylethenyl, 2-methylethenyl, 2-propenyl, 1-methyl-3-propenyl, 3-butenyl, 1-methyl-3-butenyl, isobutenyl, 3-pentenyl, and 4-hexenyl.

According to the present invention, when a nematic liquid crystal composition such as described above containing, even among the liquid crystal compounds represented by the general formula (II), a liquid crystal compound represented by the following general formula (III) is used, it is preferable because the liquid crystal composition exhibits particularly excellent liquid crystal display characteristics.

[Chemical Formula 18]

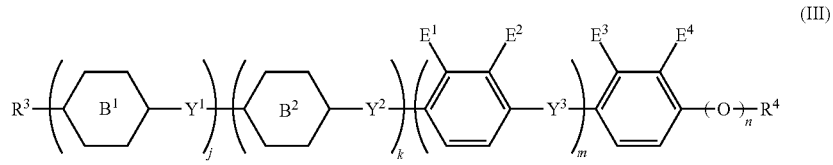

(III)

wherein ring $B^1$, ring $B^2$, $Y^1$, $Y^2$, $Y^3$, $R^3$, $R^4$, j, k, m and n have the same meanings as defined in the general formula (II); $E^1$, $E^2$, $E^3$ and $E^4$ each represent hydrogen, chlorine, fluorine, —$CF_3$, —$OCF_3$ or —$OCF_2H$; and at least one of the $E^1/E^2$ combination and the $E^3/E^4$ combination consists of other than hydrogen.

Of the liquid crystal compounds of formula (III), preferred is the one in which $E^1$, $E^2$, $E^3$, and $E^4$ are each hydrogen or fluorine, namely the one in which one of the $E^1/E^2$ combination and the $E^3/E^4$ combination consists solely of fluorine atoms with the other consisting solely of hydrogen atoms or the one in which both the combinations consist solely of fluorine atoms, for the nematic liquid crystal composition containing this compound provides further improved display characteristics, such as response time, and reliability.

Specific examples of the compound represented by the general formula (II) include compounds having the structures shown below. However, the present invention is not intended to be limited to the following compounds. In the chemical formulas shown below, $R^{13}$ represents an alkyl group having 2 to 5 carbon atoms, and $R^{14}$ represents an alkyl group having 1 to 5 carbon atoms.

[Chemical Formula 19]

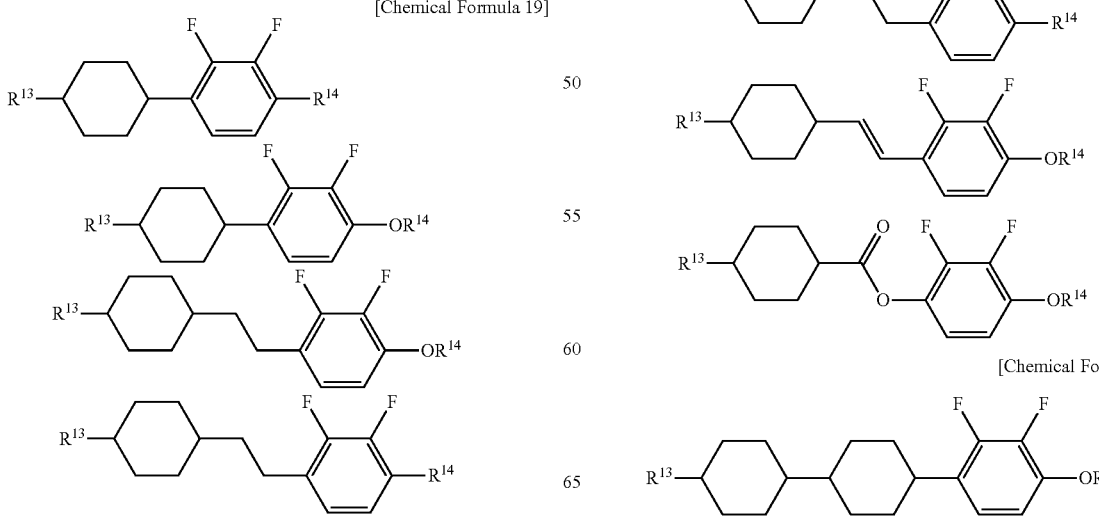

-continued

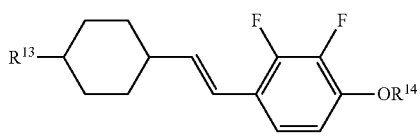

-continued

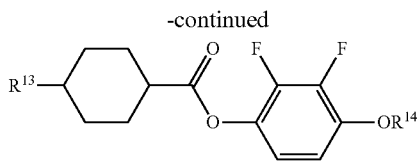

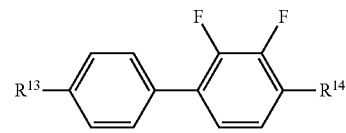

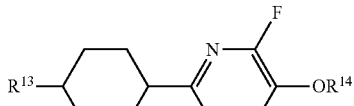

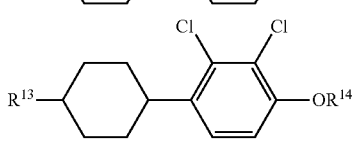

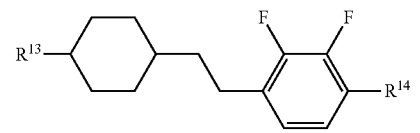

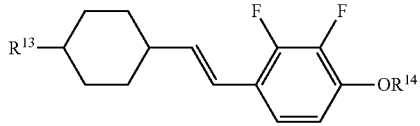

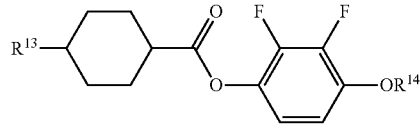

[Chemical Formula 20]

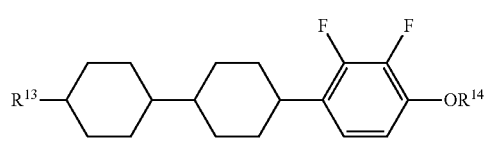

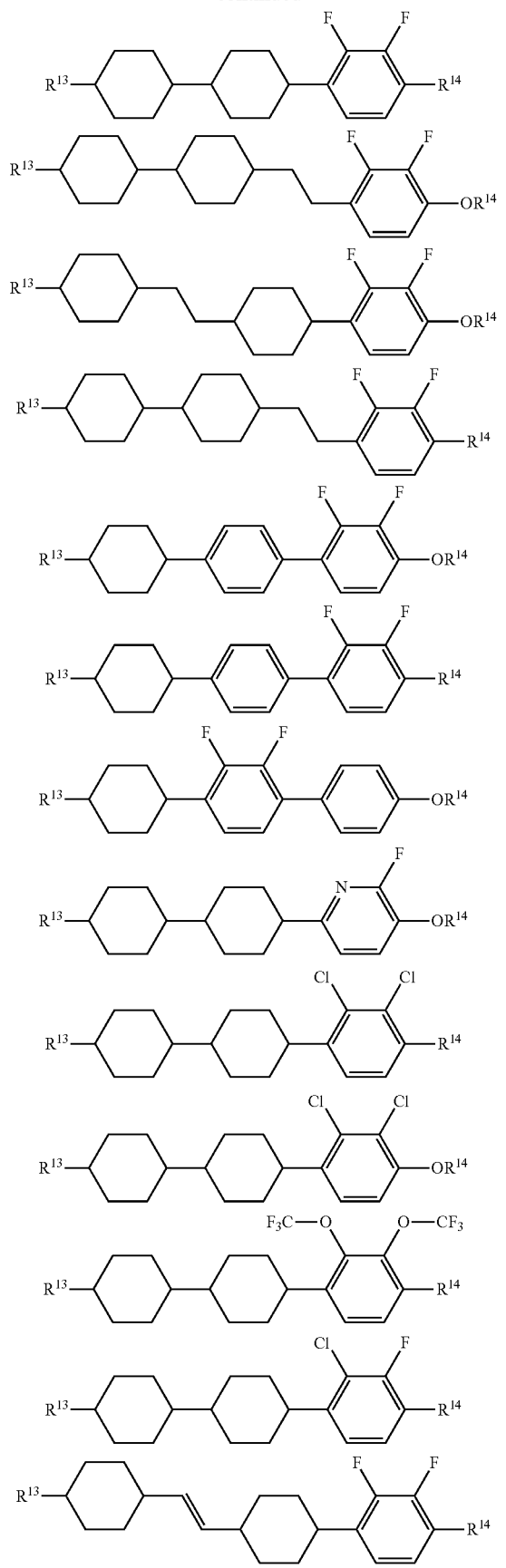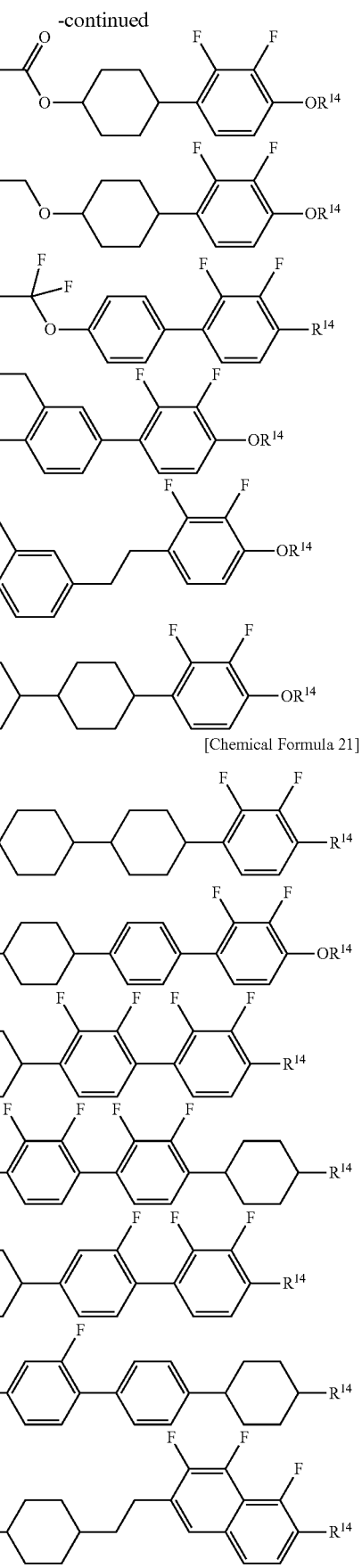

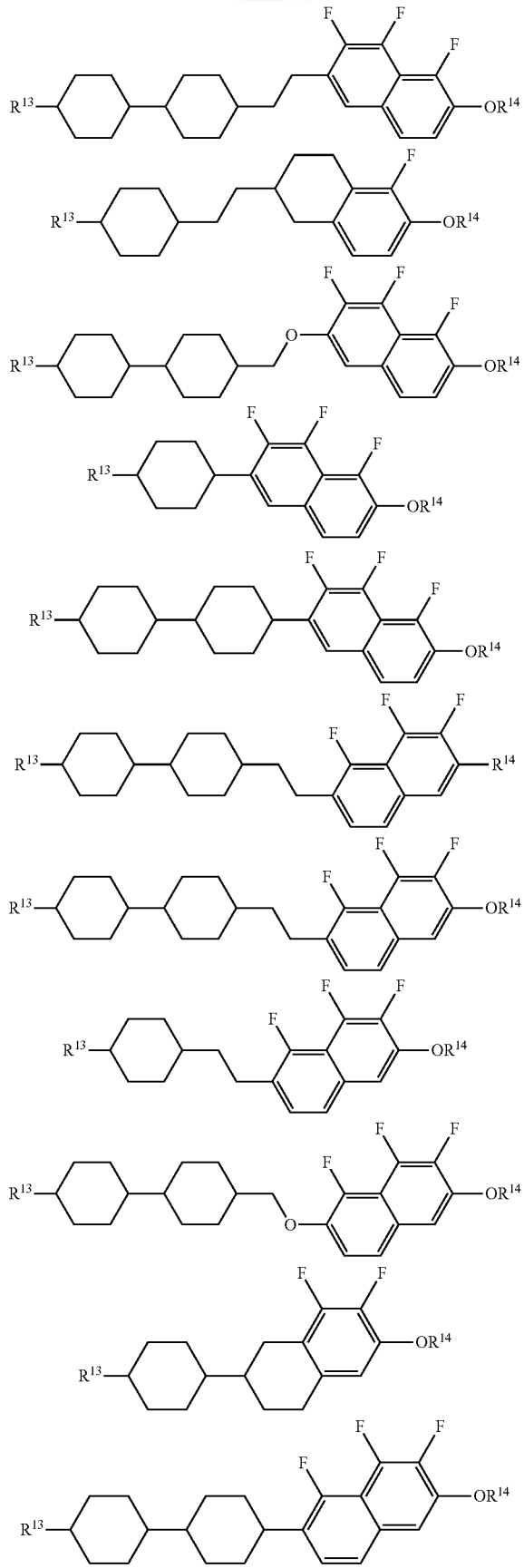

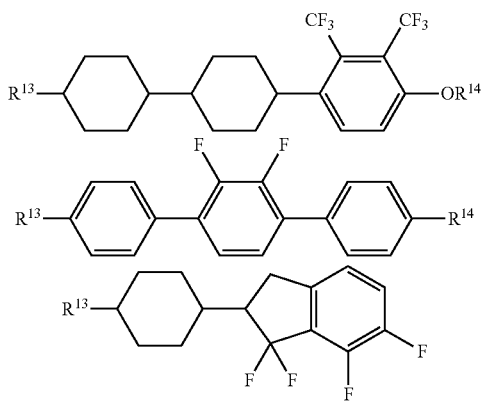

Among these, the following compounds are preferably used. Meanwhile, the compounds shown below are included in the class of the liquid crystal compounds represented by the general formula (III).

[Chemical Formula 23]

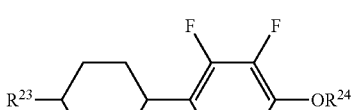 (III-1)

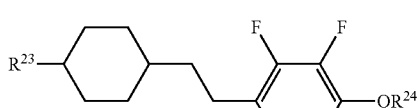 (III-2)

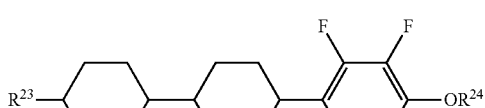 (III-3)

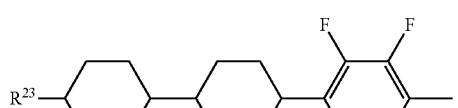 (III-4)

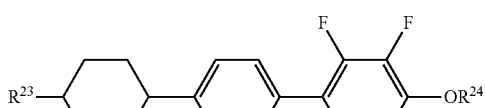 (III-5)

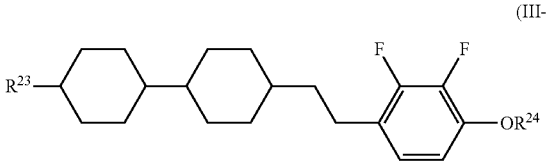 (III-6)

wherein $R^{23}$ represents an alkyl group having 2 to 5 carbon atoms; and $R^{24}$ represents an alkyl group having 1 to 5 carbon atoms.

Furthermore, when a composition containing a liquid crystal compound represented by the following general formula (IV) is used as the nematic liquid crystal composition having negative dielectric anisotropy (Δ∈) used in the present invention, it is preferable because the liquid crystal composition exhibits even further excellent liquid crystal display characteristics. The content of the liquid crystal compound in the nematic liquid crystal composition is preferably 5% to 50% by mass, and more preferably 10% to 50% by mass. If the content is less than 5% by mass, the effect of use is insufficient, and if the content is greater than 50% by mass, the voltage holding ratio is prone to decrease.

[Chemical Formula 24]

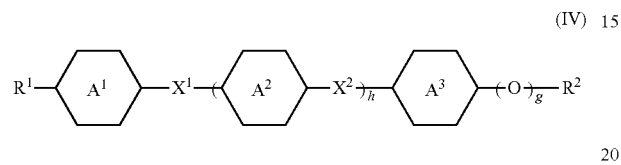

(IV)

wherein rings $A^1$, $A^2$ and $A^3$ each independently represent a 1,4-phenylene group, a 1,4-cyclohexylene group, a 1,4-cyclohexelene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH$_2$— in these rings may be substituted with —S—, —N= or —O—;

$X^1$ and $X^2$ each independently represent a direct bond, —CH$_2$—CH$_2$—, —CF$_2$—CF$_2$—, —CH=CH—, —CF=CF—, —CH$_2$—O—, —O—CH$_2$—, —CF$_2$—O—, —O—CF$_2$— or —C≡C—;

$R^1$ and $R^2$ each independently represent an alkyl group having 1 to 6 carbon atoms or an alkenyl group having 2 to 6 carbon atoms; and g and h each independently represent 0 or 1.

As the alkyl group having 1 to 3 carbon atoms and the alkoxy group having 1 to 3 carbon atoms, which may substitute the hydrogen atom of the rings represented by $A^1$, $A^2$ and $A^3$ in the general formula (IV), those groups mentioned as examples of the alkyl group having 1 to 3 carbon atoms and the alkoxy group having 1 to 3 carbon atoms, which may substitute the hydrogen atom of the rings represented by $C^1$, $C^2$, $C^3$ and $C^4$ in the general formula (I), may be used.

As the alkyl group having 1 to 6 carbon atoms and the alkenyl groups having 2 to 6 carbon atoms, which are represented by $R^1$ and $R^2$ in the general formula (IV), those mentioned as examples of the alkyl group having 1 to 6 carbon atoms and the alkenyl group having 2 to 6 carbon atoms, which are represented by $R^3$ and $R^4$ in the general formula (II), may be used.

Specific examples of the compound represented by the general formula (IV) include compounds having the structures shown below. However, the present invention is not intended to be limited to the following compounds. Meanwhile, in the chemical formulas shown below, $R^{11}$ and $R^{12}$ each represent an alkyl group having 1 to 6 carbon atoms, or an alkenyl group having 2 to 6 carbon atoms.

[Chemical Formula 25]

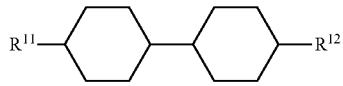

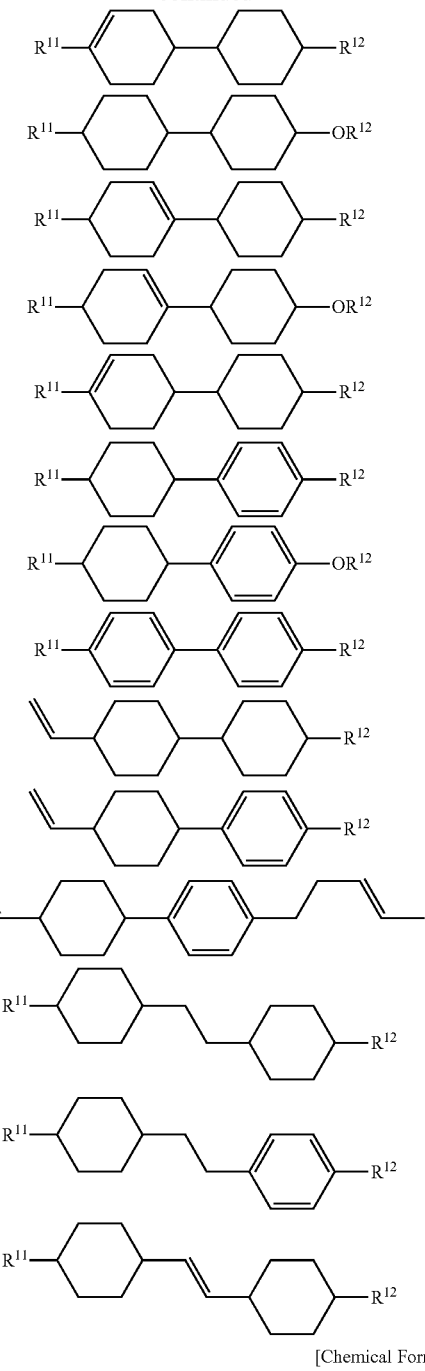

[Chemical Formula 26]

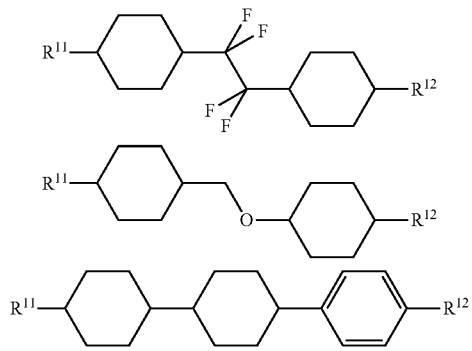

-continued

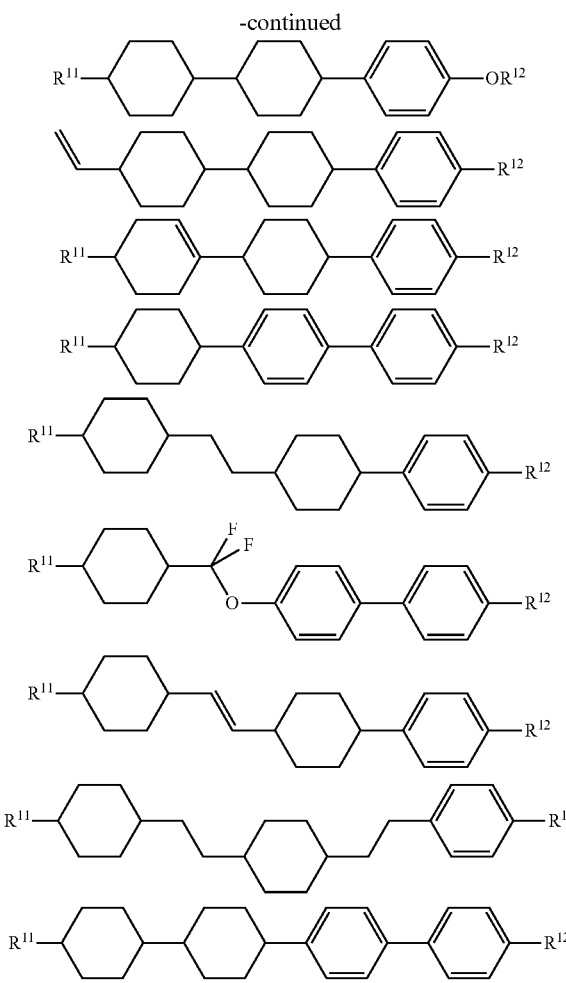

Among these, the following compounds are preferably used. Meanwhile, in the chemical formulas shown below, $R^{21}$ and $R^{22}$ each represent an alkyl group having 2 to 5 carbon atoms, or an alkenyl group having 2 to 6 carbon atoms.

[Chemical Formula 27]

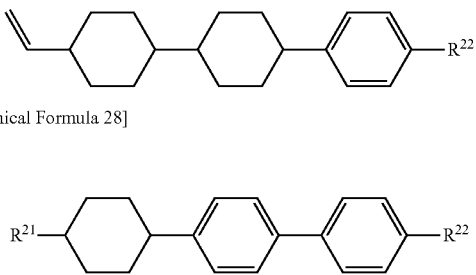

(IV-1)

(IV-2)

(IV-3)

(IV-4)

(IV-5)

-continued

(IV-6)

[Chemical Formula 28]

(IV-7)

In the nematic liquid crystal composition used in the liquid crystal composition of the present invention, those conventionally used liquid crystal compounds can be used in addition to the liquid crystal compounds described above, to the extent that the dielectric anisotropy ($\Delta\epsilon$) becomes negative. Examples of the conventionally used liquid crystal compounds include, but are not particularly limited to, the following various compounds. Meanwhile, in the following chemical formulas, $W^1$ represents a hydrogen atom, or an alkyl group, an alkoxy group, an alkenyl group, an alkenyloxy group, an alkynyl group, an alkynyloxy group, an alkoxyalkyl group, an alkanoyloxy group or an alkoxycarbonyl group, which all have 1 to 8 carbon atoms and may be branched, and these may be substituted with a halogen atom, a cyano group or the like. $W^2$ represents a cyano group, a halogen atom, or a group represented by $W^1$; and $W^3$, $W^4$ and $W^5$ each represent a hydrogen atom, a halogen atom, or a cyano group. However, compounds corresponding to the general formulas (II) and (IV) shown above are excluded.

[Chemical Formula 29]

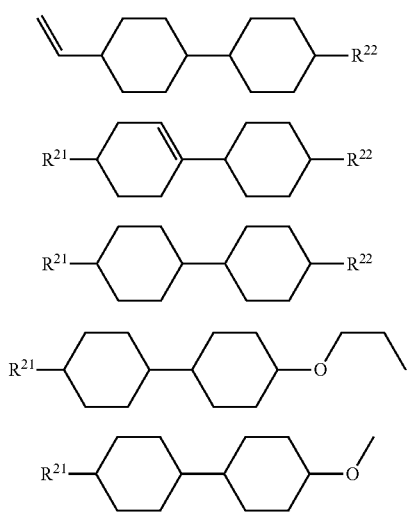

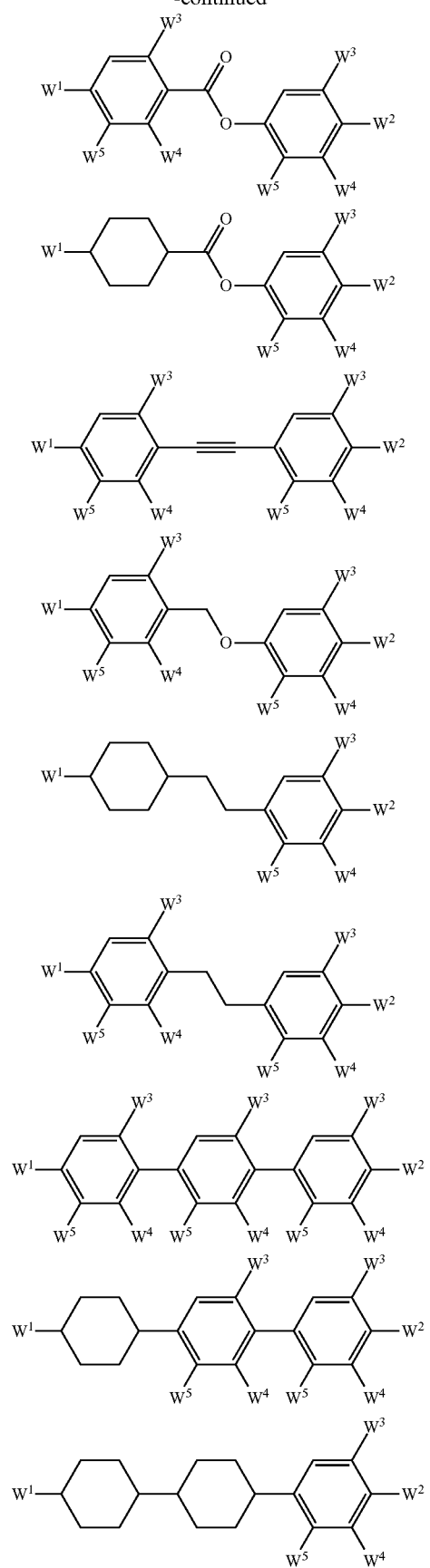
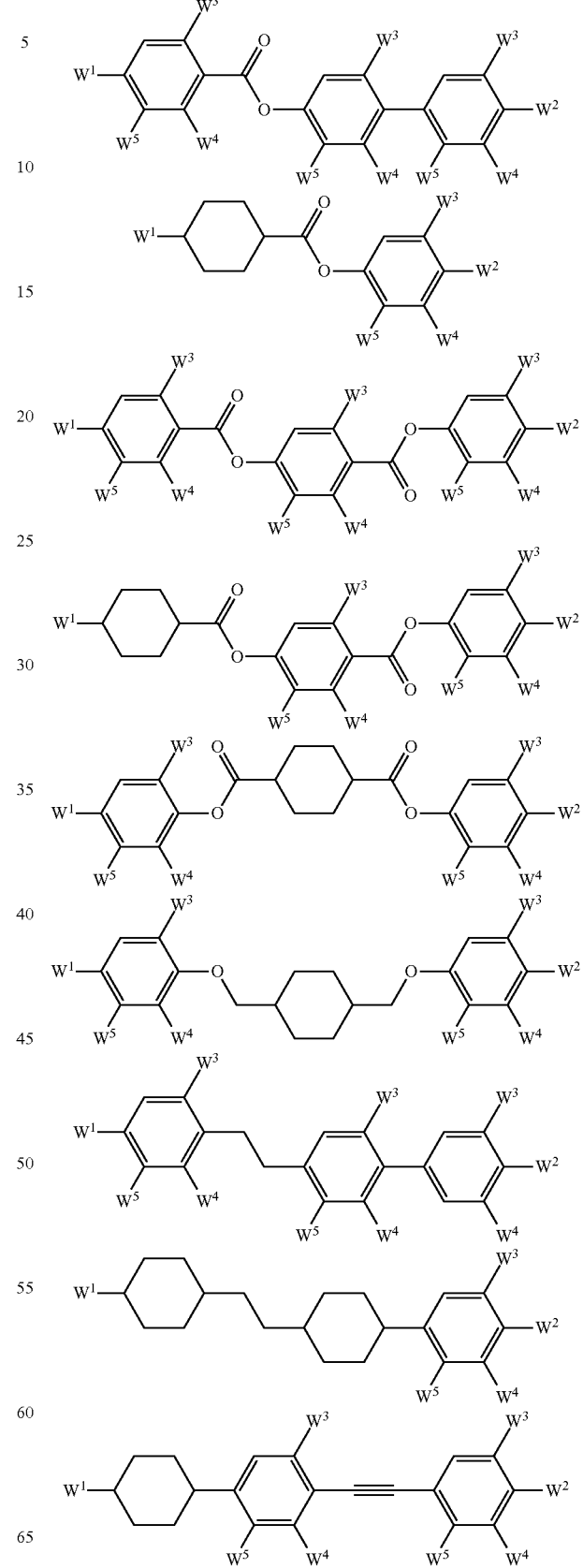
[Chemical Formula 30]

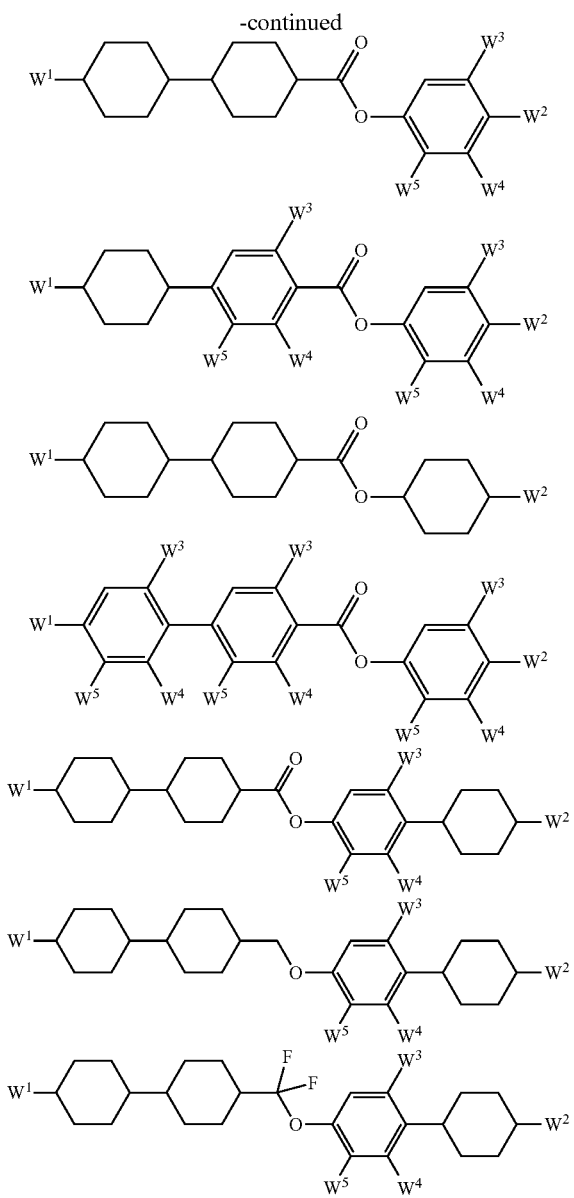

In the liquid crystal composition of the present invention, a photopolymerization initiator can be further added and used. As this photopolymerization initiator, those already known compounds can be used, and examples include benzoin ethers such as benzoin butyl ether; benzyl ketals such as benzyl dimethyl ketal; α-hydroxyacetophenones such as 1-hydroxy-1-benzoylcyclohexane, 2-hydroxy-2-benzoylpropane, and 2-hydroxy-2-(4'-isopropyl)benzoylpropane; chloroacetophenones such as 4-butylbenzoyltrichloromethane, and 4-phenoxybenzoyldichloromethane; α-aminoacetophenones such as 1-benzyl-1-dimethylamino-1-(4'-morpholinobenzoyl)propane, 2-morpholyl-2-(4'-methylmercapto)benzoylpropane, 9-n-butyl-3,6-bis(2'-morpholinoisobutyroyl)carbazole, and 2-methyl-1-[4-(methylthio)phenyl]-2-morpholinopropan-1-one; acylphosphine oxides such as bis(2,4,6-timethylbenzoyl)-phenylphosphine oxide; α-dicarbonyls such as benzil, and methyl benzoylformate; triazines such as p-methoxyphenyl-2,4-bis(trichloromethyl)-s-triazine, 2-methyl-4,6-bis(trichloromethyl)-s-triazine, 2-phenyl-4,6-bis(trichloromethyl)-s-triazine, 2-naphthyl-4,6-bis(trichloromethyl)-s-triazine, and 2-(p-butoxystyryl)-s-triazine; α-acyloxime esters such as the compounds described in JP-A No. 2000-80068, JP-A No. 2001-233842, JP-A No. 2005-97141, Japanese Translation of PCT Application (JP-T) No. 2006-516246, Japanese Patent No. 3860170, Japanese Patent No. 3798008, and WO 2006/018973; benzoyl peroxide, 2,2'-azobisisobutyronitrile, ethylanthraquinone, 1,7-bis(9'-acridinyl)heptane, thioxanthone, 1-chloro-4-propoxythioxanthone, isopropylthioxanthone, diethylthioxanthone, benzophenone, phenyl biphenyl ketone, 4-benzoyl-4'-methyldiphenyl sulfide, 2-(p-butoxystyryl)-5-trichloromethyl-1,3,4-oxadiazole, 9-phenylacridine, 9,10-dimethylbenzophenazine, benzophenone/Michler's ketone, hexaarylbiimidazole/mercaptobenzimidazole, and thioxanthone/amine. Among these, benzoin ethers, benzyl ketals, α-hydroxyacetophenones, and α-aminoacetophenones are preferred.

Furthermore, a combination of the above-described photopolymerization initiator and a sensitizer can also be preferably used. Examples of the sensitizer include thioxanthone, phenothiazine, chlorothioxanthone, xanthone, anthracene, diphenylanthracene, and rubrene. When the photopolymerization initiator and/or the sensitizer is added, the amount of addition thereof is, in total, preferably 10 parts by mass or less, more preferably 5 parts by mass or less, and even more preferably in the range of 0.1 to 3 parts by mass, relative to 100 parts by mass of the polymerizable compound represented by the general formula (I).

Furthermore, in the liquid crystal composition of the present invention, additives may be further incorporated if necessary. Examples of the additives for adjusting the characteristics of the liquid crystal composition include a storage stabilizer, an oxidation inhibitor, an ultraviolet absorber, an infrared absorber, fine particulate products of inorganic substances and organic substances, and functional compounds such as polymers.

The storage stabilizer can impart an effect of enhancing the storage stability of the liquid crystal composition. Examples of storage stabilizers that can be used include hydroquinone, hydroquinone monoalkyl ethers, tertiary butylcatechols, pyrogallols, thiophenols, nitro compounds, 2-naphthylamines, and 2-hydroxynaphthalenes. When these are added, the amount of addition is preferably 1 part by mass or less, and more preferably 0.5 parts by mass or less, relative to 100 parts by mass of the polymerizable compound.

As the oxidation inhibitor, any known compound can be used without any particular limitations, and examples include hydroquinone, 2,6-di-t-butyl-p-cresol, 2,6-di-t-butylphenol, triphenyl phosphite, and trialkyl phosphite.

As the ultraviolet absorber, any known compound can be used without any particular limitations, and examples that can be used include compounds which have been imparted with ultraviolet absorption capacity by a salicylic acid ester compound, a benzophenol compound, a benzotriazole compound, a triazine compound, a cyanoacrylate compound, or a nickel complex salt compound.

There are no particular limitations on the additives that are incorporated as necessary to the liquid crystal composition of the present invention, and the additives can be used in appropriate amounts to the extent that the characteristics of the polymer to be produced are not impaired. However, preferably, the content of the additives as the total amount of all optional components is adjusted to be preferably 30 parts by mass or less, and more preferably 10 parts by mass or less, relative to 100 parts by mass of the total amount of the nematic liquid crystal composition having negative dielectric anisotropy (Δ∈) and the polymerizable compound represented by the general formula (I).

The liquid crystal composition of the present invention is used after the polymerizable compound is polymerized by applying any known method of using light, electromagnetic waves or heat. Preferred types of the light include ultraviolet radiation, visible radiation, and infrared radiation. Electromagnetic waves such as electron beams and X-radiation may also be used. Usually, ultraviolet radiation or visible radiation is preferred. A preferred range of the wavelength is 150 to 500 nm. A more preferred range is 250 to 450 nm, and the most preferred range is 300 to 400 nm. As the light source, a low voltage mercury lamp (e.g., a germicidal lamp, a fluorescent chemical lamp and a black light), a high pressure discharge lamp (e.g., a high pressure mercury lamp and a metal halide lamp), a short arc discharge lamp (e.g., an ultrahigh pressure mercury lamp, a xenon lamp and a mercury xenon lamp), or the like may be used, and a high pressure mercury lamp and an ultrahigh pressure mercury lamp can be preferably used. The light emitted from a light source may be irradiated directly to the liquid crystal composition, or a specific wavelength (or a specific wavelength region) selected by means of a filter may be irradiated to the liquid crystal composition. A preferred irradiation energy density is 10 to 50,000 mJ/cm$^2$, and a more preferred range is 10 to 20,000 mJ/cm$^2$. A preferred intensity of illumination is 0.1 to 5,000 mW/cm$^2$, and a more preferred intensity of illumination is 1 to 2,000 mW/cm$^2$. If the amount of exposure is small, polymerization is likely to occur insufficiently, and if the amount of exposure is large, there is a risk that the voltage holding ratio (VHR) may decrease.

Next, the electro-optical display element of the present invention will be explained. The electro-optical display element of the present invention is produced by sandwiching the liquid crystal composition of the present invention between a pair of substrates, with at least one of the substrates including thereon an electrode for applying a voltage to the liquid crystal molecules, and then polymerizing the polymerizable compound represented by the general formula (I) through irradiation of an energy radiation such as ultraviolet radiation.

There are no particular limitations on the substrate, and any substrate that has been conventionally used in electro-optical display elements can be used. Thus, a substrate which is appropriate for the intended drive system and display system may be used. Examples of the energy radiation include, in addition to ultraviolet radiation, those radiations based on light, electromagnetic waves or heat as described above.

The electro-optical display element of the present invention may be driven by any of an AM system and a passive matrix (PM) system. A liquid crystal display element that is driven by an AM system or a PM system can be applied to any liquid crystal displays of reflection type, transmission type and semi-transmission type.

Furthermore, the electro-optical display element of the present invention can be used as a DS (dynamic scattering) mode element which uses a liquid crystal composition containing an added electroconductive agent, an NCAP (nematic curvilinear aligned phase) element which is produced by microencapsulating a liquid crystal composition, or a PD (polymer dispersed) element which is produced by forming a three-dimensional network-shaped polymer in a liquid crystal composition, for example, a PN (polymer network) element.

Since the liquid crystal composition of the present invention has characteristics such as described above, the liquid crystal composition can be suitably used in, inter alia, a liquid crystal display element of an AM system which displays in a display mode utilizing negative dielectric anisotropy, for example, the VA mode, the IPS mode or the like. Particularly, the liquid crystal composition can be suitably used in a liquid crystal display element of an AM system which displays in the VA mode.

In a liquid crystal display element which displays in the VA mode or the like, the direction of the electric field is perpendicular to the liquid crystal layer. On the other hand, in a liquid crystal display element which displays in the IPS mode or the like, the direction of the electric field is parallel to the liquid crystal layer. The structure of a liquid crystal display element which displays in the VA mode is reported in, for example, K. Ohmuro, S. Kataoka, T. Sasaki and Y. Koike, SID '97 Digest of Technical Papers, 28, 845 (1997), and the structure of a liquid crystal display element which displays in the IPS mode is reported in, for example, WO 91/10936 (family: U.S. Pat. No. 5,576,867).

Electro-optical display elements produced by using the liquid crystal composition of the present invention can be used in applications such as timepieces, calculators, measuring instruments, automotive panels, copying machines, cameras, office appliances, PDAs, laptop computers, monitors, television sets, mobile telephones, dimming windows, light shutters, and polarization switching elements. However, particularly due to its characteristics, the electro-optical display elements of the present invention are suitably used in the applications of large-sized PDAs, laptop computers, monitors and television sets.

EXAMPLES

Hereinafter, the present invention will be described in more detail by way of Examples, but the present invention is not intended to be limited thereto.

In the Reference Example described below, a nematic liquid crystal composition related to the present invention, which has negative Δ∈, was prepared, and in the Synthesis Example described below, a polymerizable compound related to the present invention and a comparative polymerizable compound were synthesized.

In Examples 1-1 to 1-6 and Comparative Example 1-1 described below, liquid crystal compositions were prepared by using the nematic liquid crystal composition obtained in the Reference Example and the polymerizable compound related to the present invention or the comparative polymerizable compound obtained in the Synthesis Example, and various characteristics of the liquid crystal compositions were compared and evaluated. In Comparative Example 1-2, a polymerizable compound was not used, the characteristics of the nematic liquid crystal composition itself obtained in the Reference Example was evaluated.

In Examples 2-1 to 2-5 and Comparative examples 2-1 to 2-3 described below, the reactivity of the polymerizable compound related to the present invention or the comparative polymerizable compound was compared and evaluated.

In Examples 3-1 to 3-2 and Comparative Example 3-1 described below, liquid crystal compositions were prepared by incorporating the polymerizable compound related to the present invention or the comparative polymerizable compound into the nematic liquid crystal composition related to the present invention, and electro-optical display elements were produced using the liquid crystal compositions. The orientation stability (VT shift) of the electro-optical display elements thus obtained was compared and evaluated.

Reference Example

Preparation of Nematic Liquid Crystal Composition Having Negative Δ∈

Liquid crystal compounds No. 1 to No. 10 were mixed according to the mixing ratios described below (total 100 parts by mass), and thus liquid crystal composition No. 1 was prepared. Meanwhile, the liquid crystal compounds No. 1 to No. 4 are compounds corresponding to the general formula (IV) shown above, and the liquid crystal compounds No. 5 to No. 10 are compounds corresponding to the general formula (II) shown above.

[Chemical Formula 31]

Liquid crystal compound No.1

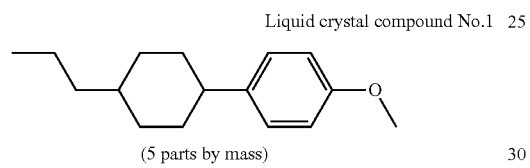

(5 parts by mass)

Liquid crystal compound No.2

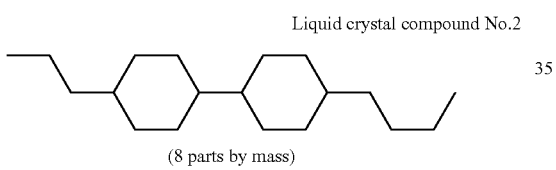

(8 parts by mass)

Liquid crystal compound No.3

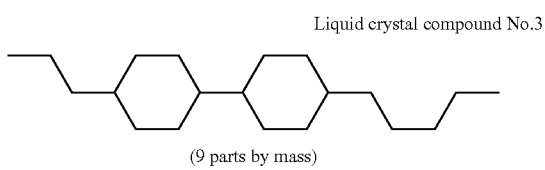

(9 parts by mass)

Liquid crystal compound No.4

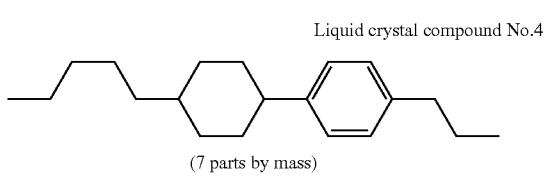

(7 parts by mass)

[Chemical Formula 32]

Liquid crystal compound No. 5

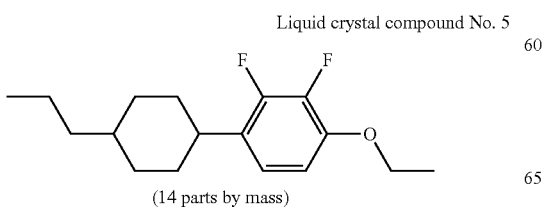

(14 parts by mass)

Liquid crystal compound No. 6

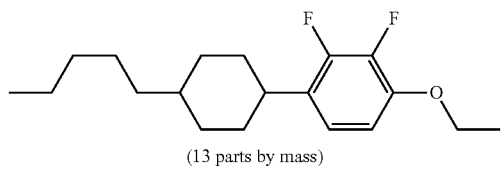

(13 parts by mass)

Liquid crystal compound No. 7

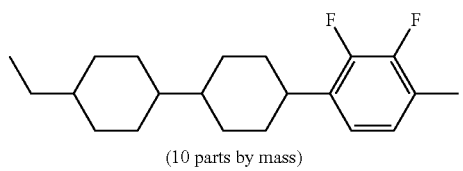

(10 parts by mass)

Liquid crystal compound No. 8

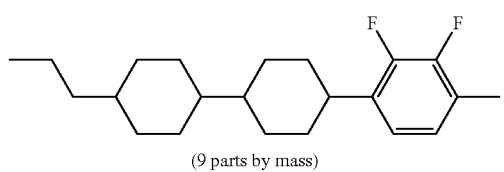

(9 parts by mass)

Liquid crystal compound No. 9

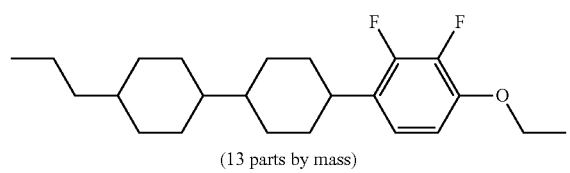

(13 parts by mass)

Liquid crystal compound No. 10

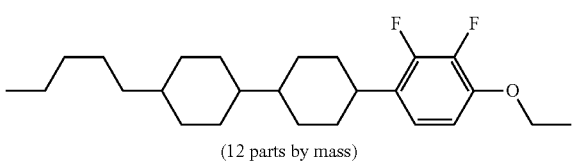

(12 parts by mass)

Synthesis Example

Synthesis of Polymerizable Compounds

According to the following reaction scheme 1, polymerizable compound No. 1 was synthesized by the following procedure.

(Reaction Scheme 1)

[Chemical Formula 33]

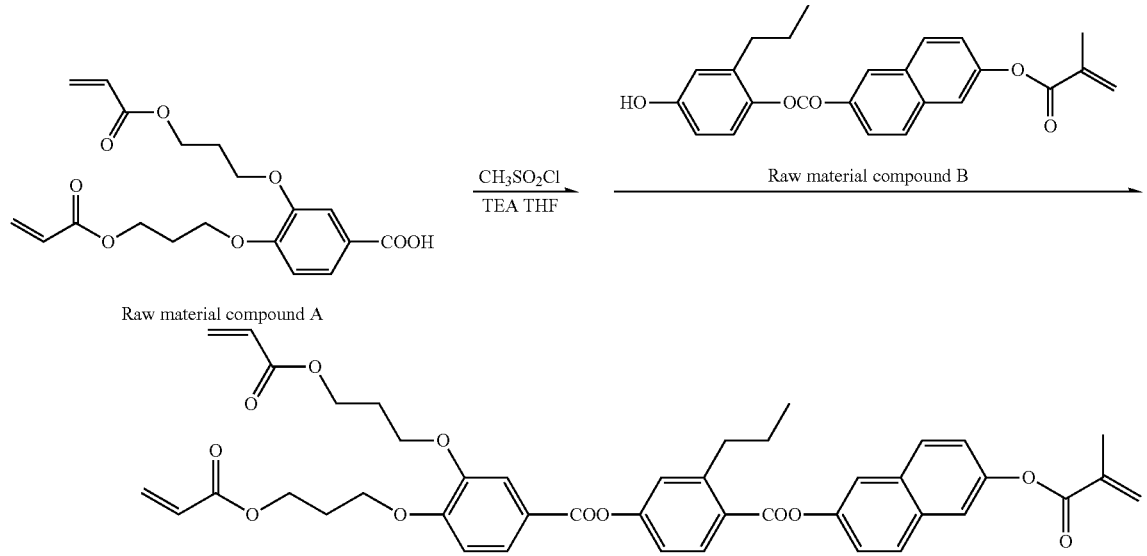

In a nitrogen atmosphere, 0.35 g (3.07 mmol) of methanesulfonyl chloride and 2 g of tetrahydrofuran (THF) were mixed, and the mixture was cooled to −20° C. A solution prepared by dissolving 1.02 g (2.69 mmol) of a raw material compound A and 0.31 g (3.07 mmol) of triethylamine (TEA) in 2 g of THF was added dropwise to the mixture. After the resulting mixture was stirred for one hour, 3 mg (0.03 mmol) of dimethylaminopyridine (DMAP) and 0.31 g (3.07 mmol) of TEA were added to the mixture at −20° C. Subsequently, a solution obtained by dissolving 1.00 g (2.56 mmol) of a raw material compound B in 4 g of THF was added dropwise to the mixture, and the resulting mixture was allowed to react for 2 hours at room temperature. After completion of the reaction, 0.5 N hydrochloric acid and ethyl acetate were added thereto, and the mixture was subjected to oil-water separation. Subsequently, the organic layer was washed with water. The organic layer thus obtained was dried over sodium sulfate, and then was separated by filtration. Subsequently, the solvent of the organic layer was removed, and the resulting product was purified by silica gel column chromatography (developing solvent: toluene/ethyl acetate=20/1) and crystallization (toluene/methanol=2/7). Thus, 1.1 g (yield 57.3%) of the target product, polymerizable compound No. 1, was obtained. Meanwhile, it was confirmed through an analysis by NMR and IR that the resulting product was the target product. The analysis results are presented in [Table 1] and [Table 2].

Polymerizable compound No. 2, polymerizable compound No. 5, polymerizable compound No. 9, polymerizable compound No. 15 and polymerizable compound No. 16, and comparative compounds No. 1 to No. 4 shown below were synthesized according to the technique used for the polymerizable compound No. 1 as described above or known techniques. The analysis results for the polymerizable compounds related to the present invention are presented in [Table 1] and [Table 2].

TABLE 1

| Compound | $^1$H-NMR (CDCl3) Chemical shift ppm (multiplicity: number of protons) |
| --- | --- |
| Polymerizable compound No. 1 | 0.9(t; 3H), 1.7(q; 2H), 2.1(s; 3H), 2.3(q; 4H), 2.6(t; 2H), 4.2(m; 4H), 4.4(m; 4H), 5.9(m; 3H), 6.1-6.2(m; 2H), 6.4-6.5(m, 3H), 7.0(d; 1H), 7.1-7.2(m; 2H), 7.2-7.3(t; 1H), 7.4(d; 1H), 7.7(t; 2H), 7.8-7.9(d; 1H), 7.9-8.0(d; 1H), 8.0-8.1(d; 1H), 8.2-8.3(d; 1H), 8.8(s; 1H) |
| Polymerizable compound No. 2 | 1.9(s; 3H), 3.0(t; 2H), 4.3(t; 2H), 5.5(t; 1H), 6.0-6.1(t; 3H), 6.2-6.3(m; 2H), 6.6(d; 2H), 7.1(m; 2H), 7.2-7.3(d; 2H), 7.4(d; 1H), 8.0(m; 2H) |
| Polymerizable compound No. 5 | 0.9(t; 3H), 1.7(q; 2H), 2.0(s; 6H), 2.1(s; 3H), 2.3(q; 4H), 2.6(t; 2H), 4.2(m; 4H), 4.4(m; 4H), 5.6(q; 2H), 5.9(d; 1H), 6.1-6.2(s; 2H), 6.4-6.5(s; 1H), 7.0(d; 1H), 7.1-7.2(m; 2H), 7.2-7.3(t; 1H), 7.4(d; 1H), 7.7(t; 2H), 7.8-7.9(d; 1H), 7.9-8.0(d; 1H), 8.0-8.1(d; 1H), 8.2-8.3(d; 1H), 8.8(s; 1H) |
| Polymerizable compound No. 9 | 1.0(t; 3H), 1.5-1.6(m; 4H), 1.9-2.0(m; 2H), 2.2-2.3(q; 4H), 2.6(t; 2H), 4.1(t; 2H), 4.2-4.2(m; 6H), 4.4(t; 2H), 5.8-5.9(m; 3H), 6.1-6.2(m; 3H), 6.4-6.5(m; 3H), 7.0(d; 1H), 7.2-7.3(m; 4H), 7.3(d; 1H), 7.5(d; 1H), 7.7(d; 1H), 7.8(d; 1H), 7.8(d; 1H), 7.9-7.9(m; 2H), 8.0(d; 1H), 8.1(d; 1H), 8.2(d; 1H), 8.3(d; 1H), 8.7(s; 1H), 8.8(s; 1H) |

TABLE 1-continued

| Compound | $^1$H-NMR (CDCl3) Chemical shift ppm (multiplicity: number of protons) |
|---|---|
| Polymerizable compound No. 15 | 1.1(t; 3H), 1.3-1.6(m; 4H), 1.7(q; 2H), 1.9(q; 2H), 2.9(q; 2H), 4.1(t; 2H), 4.2(t; 2H), 5.8(m; 1H), 6.0-6.2(m; 3H), 6.2-6.5(m; 3H), 6.6(d; 2H), 7.1-7.3(m; 3H), 7.4-7.5(m; 2H), 7.7-7.9(m; 3H), 8.1-8.2(m; 3H), 8.7(s; 1H) |
| Polymerizable compound No. 16 | 0.9(t; 3H), 1.7(q; 2H), 2.1(s; 3H), 2.3(q; 4H), 2.6(t; 2H), 4.2(m; 4H), 4.4(m; 4H), 5.8(m; 3H), 6.1-6.2(m; 2H), 6.4-6.5(m; 3H), 7.0(d; 1H), 7.1-7.2(m; 2H), 7.2-7.3(t; 1H), 7.3(d; 2H), 7.7(t; 1H), 7.8-7.9(d; 1H), 8.2-8.3(d; 2H) |

TABLE 2

| Compound | IR/cm$^{-1}$ |
|---|---|
| Polymerizable compound No. 1 | 480, 574, 613, 643, 722, 745, 809, 892, 916, 948, 972, 1056, 1113, 1147, 1169, 1264, 1320, 1341, 1408, 1429, 1474, 1492, 1516, 1601, 1633, 1721, 2954 |
| Polymerizable compound No. 2 | 438, 470, 518, 557, 596, 660, 685, 718, 756, 794, 808, 844, 860, 877, 898, 920, 944, 978, 991, 1008, 1068, 1118, 1163, 1190, 1203, 1230, 1282, 1328, 1378, 1408, 1466, 1508, 1609, 1633, 1704, 1728, 1751, 1984, 2927 |
| Polymerizable compound No. 5 | 430, 465, 478, 518, 619, 644, 660, 724, 749, 766, 786, 813, 872, 892, 919, 943, 1004, 1045, 1087, 1117, 1140, 1168, 1193, 1241, 1268, 1315, 1403, 1429, 1474, 1451, 1475, 1493, 1514, 1603, 1633, 1723, 2931, 2959 |
| Polymerizable compound No. 9 | 408, 476, 503, 554, 589, 630, 662, 726, 750, 763, 810, 868, 888, 906, 935, 965, 1009, 1073, 1143, 1168, 1181, 1269, 1337, 1393, 1408, 1428, 1470, 1493, 1505, 1518, 1598, 1624, 1718, 2866, 2942 |
| Polymerizable compound No. 15 | 586, 756, 799, 829, 864, 903, 945, 980, 1015, 1072, 1146, 1188, 1281, 1346, 1400, 1481, 1501, 1620, 1701, 1720, 1751, 2858, 2943, 3082 |
| Polymerizable compound No. 16 | 470, 499, 540, 573, 631, 653, 671, 689, 723, 753, 810, 889, 918, 972, 1016, 1053, 1075, 1091, 1114, 1142, 1159, 1171, 1260, 1292, 1318, 1410, 1490, 1504, 1517, 1601, 1634, 1714, 1736, 2871, 2962 |

For the polymerizable compound No. 1 thus obtained, the heat transfer behavior was examined by measuring the behavior with a differential scanning calorimeter (DSC7; manufactured by Perkin Elmer, Inc.), from 25° C. to 180° C. at a rate of temperature increase of 5° C./min in a nitrogen atmosphere (50 ml/min) The results are shown below.

[Chemical Formula 34]

$$Cr \xrightleftharpoons[41°\,C.]{74°\,C.} I$$

Cr: Crystalline phase,
I: Isotropic liquid phase

For the polymerizable compound No. 2 thus obtained, the heat transfer behavior was examined by measuring the behavior with a differential scanning calorimeter (DSC7; manufactured by Perkin Elmer, Inc.), from 25° C. to 180° C. at a rate of temperature increase of 5° C./min in a nitrogen atmosphere (50 ml/min) The results are shown below.

[Chemical Formula 35]

$$Cr \xrightleftharpoons[<25°\,C.]{111°\,C.} I$$

Cr: Crystalline phase,
I: Isotropic liquid phase

For the polymerizable compound No. 5 thus obtained, the heat transfer behavior was examined by measuring the behavior with a differential scanning calorimeter (DSC7; manufactured by Perkin Elmer, Inc.), from 25° C. to 180° C. at a rate of temperature increase of 5° C./min in a nitrogen atmosphere (50 ml/min) The results are shown below.

[Chemical Formula 36]

$$Cr \xrightleftharpoons[53°\,C.]{108°\,C.} I$$

Cr: Crystalline phase,
I: Isotropic liquid phase

For the polymerizable compound No. 9 thus obtained, the heat transfer behavior was examined by measuring the behavior with a differential scanning calorimeter (DSC7; manufactured by Perkin Elmer, Inc.), from 25° C. to 180° C. at a rate of temperature increase of 5° C./min in a nitrogen atmosphere (50 ml/min) The results are shown below.

[Chemical Formula 37]

$$Cr \xrightleftharpoons[<25°\,C.]{77°\,C.} N \xrightarrow{\text{Thermal polymerization at near 130° C.}}$$

Cr: Crystalline phase,
N: Nematic phase

For the polymerizable compound No. 15 thus obtained, the heat transfer behavior was examined by measuring the behavior with a differential scanning calorimeter (DSC7; manufactured by Perkin Elmer, Inc.), from 25° C. to 180° C. at a rate of temperature increase of 5° C./min in a nitrogen atmosphere (50 ml/min) The results are shown below.

[Chemical Formula 38]

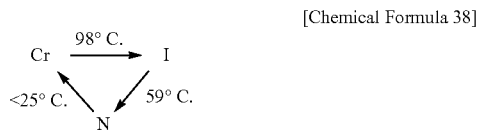

Cr: Crystalline phase,
I: Isotropic liquid phase,
N: Nematic phase

For the polymerizable compound No. 16 thus obtained, the heat transfer behavior was examined by measuring the behavior with a differential scanning calorimeter (DSC7; manufactured by Perkin Elmer, Inc.), from 25° C. to 180° C. at a rate of temperature increase of 5° C./min in a nitrogen atmosphere (50 ml/min). The results are shown below.

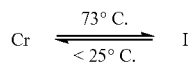

[Chemical Formula 39]

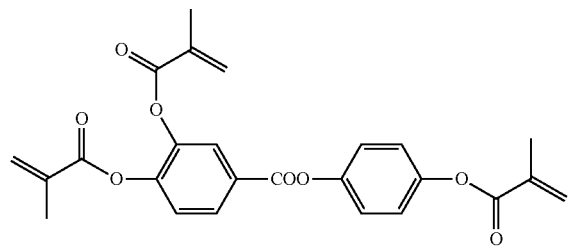

Cr: Crystalline phase, I: Isotropic liquid phase

The following Examples and Comparative Examples were carried out using the liquid crystal composition No. 1 obtained in the Reference Example, the polymerizable compounds No. 1, No. 2, No. 5, No. 9, No. 15 and No. 16 obtained in the Synthesis Example, and the comparative compounds No. 1 to No. 4.

Examples 1-1 to 1-6 and Comparative Example 1-1

Preparation of Liquid Crystal Compositions Containing Polymerizable Compound

Liquid crystal compositions each containing a polymerizable compound were obtained by adding each of the polymerizable compounds indicated in Table 3 in an amount of 0.5 parts by mass to 100 parts by mass of the liquid crystal composition No. 1. The solubility, orientation and voltage holding ratio (VHR) of the liquid crystal compositions containing a polymerizable compound thus obtained were respectively evaluated and analyzed by the following methods.

Comparative Example 1-2

The orientation and voltage holding ratio of the liquid crystal composition No. 1, as a liquid crystal composition which did not contain a polymerizable compound, were respectively evaluated and measured by the following methods.

<Solubility>

For the liquid crystal compositions thus obtained, the presence or absence of precipitates after the dissolution of the polymerizable compound was evaluated. A liquid crystal composition which showed no precipitate after one day was

[Chemical Formula 38-1]

Comparative compound No. 1

Comparative compound No. 2

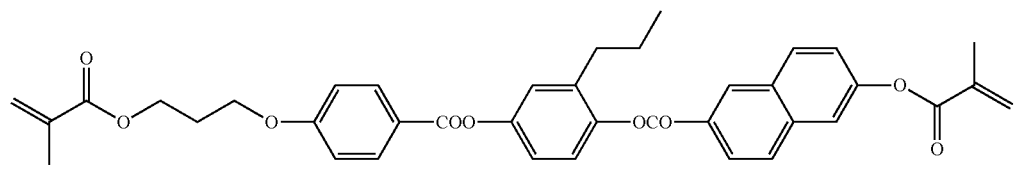

Comparative compound No. 3

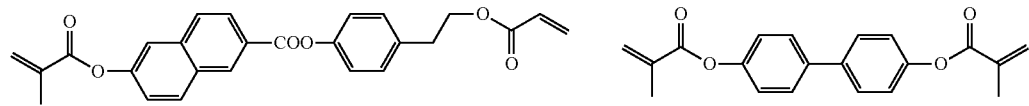

Comparative Compound No. 4

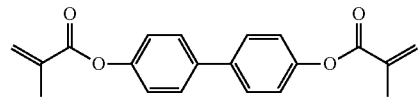

evaluated as A; a liquid crystal composition in which a precipitate was recognized after one day was evaluated as B; and a liquid crystal composition in which a precipitate was recognized immediately after dissolution was evaluated as C.

<Orientation>

Each of the liquid crystal compositions thus obtained was injected into a test cell for liquid crystal evaluation (cell thickness: 5 μm, electrode area: 8 mm×8 mm, alignment film: JALS2096), and then the injection port was sealed with a sealing agent. Thereafter, the test cell was irradiated with light using a high pressure mercury lamp (1000 mJ/cm²), and thus a sample was obtained. The samples thus obtained were subjected to polarizing microscope observation (the orientation state in a voltage-off state under crossed nicols) by visual inspection to check the orientation. A sample which showed satisfactory orientation was evaluated as "good"; and a sample which showed disordered orientation was evaluated as "no good".

<VHR (After Light Irradiation)>

The samples obtained in the evaluation of orientation as described above were subjected to the measurement of VHR using the following apparatus and under the following conditions.

Apparatus: VHR-A1 manufactured by Toyo Technica, Inc.
Conditions: Voltage pulse width 60 µs, frame period 16.7 ms, pulse height ±5 V, measurement temperature 25° C.

The results for the measurement of solubility, orientation and voltage holding ratio as described above are presented in [Table 3].

TABLE 3

|  | Polymerizable compound | Solubility | Orientation | VHR |
|---|---|---|---|---|
| Example 1-1 | Polymerizable compound No. 1 | A | good | 99.3 |
| Example 1-2 | Polymerizable compound No. 2 | B | good | 99.1 |
| Example 1-3 | Polymerizable compound No. 5 | B | good | 99.3 |
| Example 1-4 | Polymerizable compound No. 9 | A | Good | 99.3 |
| Example 1-5 | Polymerizable compound No. 15 | A | good | 99.1 |
| Example 1-6 | Polymerizable compound No. 16 | A | good | 99.3 |
| Comparative Example 1-1 | Comparative compound No. 1 | C | — | — |
| Comparative Example 1-2 | — | — | good | 99.3 |

As is obvious from the results of [Table 3], the comparative compound No. 1 having a trifunctional(meth)acryloyl group as a polymerizable group exhibited poor solubility in the liquid crystal composition, as compared therewith, the polymerizable compounds represented by the general formula (I) exhibited satisfactory solubility in the liquid crystal composition. Furthermore, the liquid crystal compositions containing the polymerizable compounds represented by the general formula (I) exhibited satisfactory orientation and voltage holding ratios. Meanwhile, since the comparative compound No. 1 did not dissolve in the liquid crystal composition, the measurement of orientation and voltage holding ratio could not be carried out.

Example 2-1

Reactivity of Polymerizable Compounds

<Samples Before Light Irradiation>

The liquid crystal composition containing a polymerizable compound obtained in Example 1-1 was dissolved in acetonitrile, and the solution was used as a sample.

<Samples After Light Irradiation>

The test cell for liquid crystal evaluation which had been used in the evaluation of orientation and irradiated with light using a high pressure mercury lamp (1000 mJ/cm$^2$) in Example 1-1, was disassembled, and the polymerizable liquid crystal composition was extracted with acetonitrile to use the extract as a sample.

The sample thus obtained was analyzed by liquid chromatography, and the residual ratio of the polymerizable compound after light irradiation was evaluated in comparison with the sample before light irradiation. The results are presented in [Table 4].

Examples 2-2 to 2-5 and Comparative Examples 2-1 to 2-3

The residual ratios of the polymerizable compounds were evaluated by the same technique as that used in Example 2-1, except that the liquid crystal composition used in Example 2-1 was changed to each of the liquid crystal compositions containing a polymerizable compound as indicated in the following [Table 4]. The results are presented in [Table 4].

TABLE 4

|  | Polymerizable compound | Residual ratio (%) |
|---|---|---|
| Example 2-1 | Polymerizable compound No. 1 | 3 |
| Example 2-2 | Polymerizable compound No. 2 | 16 |
| Example 2-3 | Polymerizable compound No. 5 | 3 |
| Example 2-4 | Polymerizable compound No. 9 | 1 |
| Example 2-5 | Polymerizable compound No. 15 | 3 |
| Comparative Example 2-1 | Comparative compound No. 2 | 30 |
| Comparative Example 2-2 | Comparative compound No. 3 | 29 |
| Comparative Example 2-3 | Comparative compound No. 4 | 53 |

As is obvious from the results of [Table 4], in the case of the comparative compounds, the compounds remained in large amounts after light irradiation, while in the case of the polymerizable compounds related to the present invention, the residual amounts after light irradiation were small, and the reactivity was high.

Examples 3-1 to 3-2 and Comparative Example 3-1

Orientation Stability

Each of the polymerizable compounds indicated in [Table 5] was added in an amount of 0.2 parts by mass to 100 parts by mass of the liquid crystal composition No. 1, and the mixture was heated. Dissolution of the polymerizable compound was confirmed, and thus the resultant was used as a liquid crystal composition. The liquid crystal composition that had been cooled to room temperature was injected into a test cell for liquid crystal evaluation (cell thickness: 5 µm, electrode area: 8 mm×8 mm, alignment film: JALS-2096 (manufactured by JSR Corp.), anti-parallel rubbing), and the test cell was irradiated with an energy radiation using a high pressure mercury lamp (intensity of illumination 40 mW/cm$^2$, amount of light 20 J/cm$^2$), without any voltage applied. The test cell was aged, and then the voltage-transmittance characteristics (VT characteristics) were measured. The measurement value was designated as the initial value. Voltage was applied to the test cell continuously for 4 hours and continuously for 10 hours, and then the VT characteristics were measured. Thus, the differences with the initial value (amounts of VT change) were investigated. The amounts of VT change were determined by averaging the amounts of change in the voltage (V10, V50, and V90) at transmittances of 10%, 50% and 90% in the VT characteristics thus measured. The results are presented in [Table 5].

TABLE 5

|  | Polymerizable compound | Amount of VT change (mV) | |
|---|---|---|---|
|  |  | 4 h | 10 h |
| Example 3-1 | Polymerizable compound No. 1 | 9 | 15 |
| Example 3-2 | Polymerizable compound No. 16 | 8 | 14 |
| Comparative Example 3-1 | Comparative compound No. 2 | 21 | 37 |

It can be clearly seen from the results of Table 5 that in the liquid crystal display elements that use the liquid crystal compositions of the present invention containing the polymerizable compounds represented by the general formula (I), the immobilized orientation was stabilized by the polymers formed from the polymerizable compounds.

It can be seen from the Examples and Comparative Examples that since the polymerizable compounds used in the liquid crystal compositions of the present invention have satisfactory solubility, the polymerizable compounds can be used at high concentrations in the liquid crystal compositions, and also, since the polymerizable compounds do not easily precipitate out, the liquid crystal compositions have excellent storage stability. Furthermore, since the polymerizable compounds have high polymerization reactivity, when the polymerizable compounds are polymerized, the polymerization is completed with a small amount of irradiation of an energy radiation such as ultraviolet radiation. Therefore, deterioration of the liquid crystal compositions is suppressed, and the voltage holding ratio can be maintained high. In addition, since the liquid crystal display elements that use the liquid crystal compositions of the present invention have small amounts of VT change against a continuously applied voltage, it is clearly seen that the elements have high reliability.

The invention claimed is:

1. A liquid crystal composition, comprising 0.01 to 3 parts by mass of a polymerizable compound represented by the following general formula (I) and 100 parts by mass of a nematic liquid crystal composition having negative dielectric anisotropy ($\Delta\varepsilon$):

[Chemical Formula I]

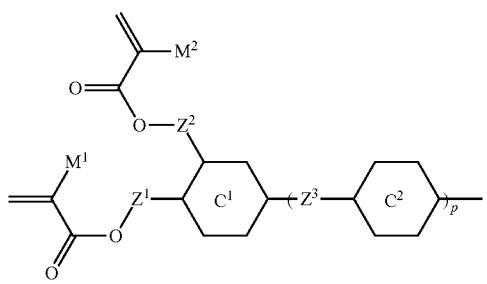
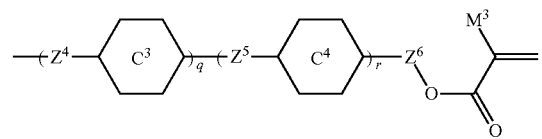

(I)

wherein ring $C^1$ represents a benzene-1,2,4-triyl group, a cyclohexane-1,2,4-triyl group, or a naphthalene-1,2,6-triyl group; rings $C^2$, $C^3$ and $C^4$ each independently represent a 1,4-phenylene group, a 1,4-cyclohexylene group or a naphthalene-2,6-diyl group; at least one hydrogen atom of these rings $C^1$, $C^2$, $C^3$ and $C^4$ may be independently substituted with an alkyl group having 1 to 3 carbon atoms, an alkoxy group having 1 to 3 carbon atoms, an acyl group having 1 to 3 carbon atoms, or a halogen atom, as a substituent;

$M^1$, $M^2$ and $M^3$ each independently represent a hydrogen atom or a methyl group;

$Z^1$ and $Z^2$ each independently represent a direct bond, $-L^1-$, $-L^1O-$, $-L^1O-CO-$, $-L^1CO-O-$ or $-L^1O-CO-O-$; $Z^6$ represents a direct bond, $-L^2-$, $-OL^2-$, $-O-COL^2-$, $-CO-OL^2-$ or $-O-CO-OL^2-$; at least any one of $Z^1$, $Z^2$ and $Z^6$ is not a direct bond; $L^1$ and $L^2$ each independently represent an optionally branched alkylene group having 1 to 10 carbon atoms, the alkylene group may be interrupted one to three times with an oxygen atom, and the interruption is achieved such that the oxygen atoms are not adjacent to each other;

$Z^3$, $Z^4$ and $Z^5$ each independently represent a direct bond, an ester bond, an ether bond, an optionally branched, saturated or unsaturated alkylene group having 2 to 8 carbon atoms, or a combination thereof; and p, q and r each independently represent 0 or 1, while $1 \leq p+q+r \leq 3$ and any of $Z^3$, $Z^4$ and $Z^5$ is not a direct bond when $p+q+r=1$.

2. The liquid crystal composition according to claim 1, wherein the ring $C^1$ in the general formula (I) is a benzene-1,2,4-triyl group, and the rings $C^2$, $C^3$ and $C^4$ are each independently a 1,4-phenylene group or a naphthalene-2,6-diyl group, each of which may be substituted with the substituent.

3. The liquid crystal composition according to claim 1, wherein in the general formula (I), $Z^1$ and $Z^2$ are groups different from $Z^6$, and/or $L^1$ and $L^2$ are groups different from each other.

4. The liquid crystal composition according to claim 1, wherein $Z^3$, $Z^4$ and $Z^5$ in the general formula (I) are each an ester bond.

5. The liquid crystal composition according to claim 1, wherein the nematic liquid crystal composition having negative dielectric anisotropy ($\Delta\varepsilon$) contains a liquid crystal compound represented by the following general formula (II):

[Chemical Formula 2]

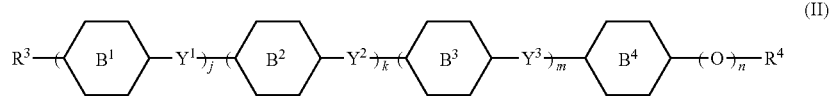

(II)

wherein rings B¹, B², B³ and B⁴ each independently represent a 1,4-phenylene group, a 1,4-cyclohexylene group, a 1,4-cyclohexylene group, a naphthalene-2,6-diyl group, a decahydronaphthalene-2,6-diyl group, a tetrahydronaphthalene-2,6-diyl group or a 2,5-indanylene ring; at least one hydrogen atom of these rings may be independently substituted with an alkyl group having 1 to 3 carbon atoms, an alkoxy group having 1 to 3 carbon atoms, a chlorine atom or a fluorine atom; —CH= in these rings may be substituted with —N=; —CH₂— in these rings may be substituted with —S—, —N= or —O—; two or more hydrogen atoms of at least one of the rings B³ and B⁴ are substituted by substitutes which may be the same or different and are selected from chlorine, fluorine, —CF₃—, —OCF₃, and —OCF₂H;

Y¹, Y² and Y³ each independently represent a direct bond, —CH₂—CH₂—, —CF₂—CF₂—, —CH=CH—, —CF=CF—, —CH₂—O—, —O—CH₂—, —CF₂—O—, —O—CF₂—, —CH₂—S—, —S—CH₂—, —CF₂—S—, —S—CF₂—, —O—CF₂—C₂H₄—, —C₂H₄—CF₂—O—, —CO—O—, —O—CO—, —CH₂—CH₂—CO—O—, —O—CO—CH₂—CH₂— or —C≡C—;

R³ and R⁴ each independently represent an alkyl group having 1 to 6 carbon atoms, or an alkenyl group having 2 to 6 carbon atoms;

j, k and m each independently represent 0 or 1, while j+k+m≥1; and n represents 0 or 1.

6. The liquid crystal composition according to claim 5, wherein the liquid crystal compound represented by the general formula (II) is a liquid crystal compound represented by the following general formula (III):

[Chemical Formula 3]

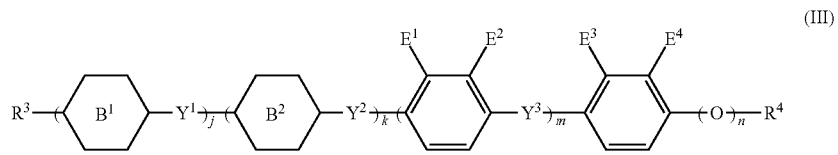
(III)

wherein ring B¹, ring B², Y¹, Y², Y³, R³, R⁴, j, k, m and n have the same meanings as defined in the general formula (II); E¹, E², E³ and E⁴ each represent hydrogen, chlorine, fluorine, —CF₃, —OCF₃ or —OCF₂H; and at least one of the E¹/E² combination and the E³/E⁴ combination consists of other than hydrogen.

7. The liquid crystal composition according to claim 1, wherein the nematic liquid crystal composition having negative dielectric anisotropy (Δ∈) further contains a liquid crystal compound represented by the following general formula (IV):

[Chemical Formula 4]

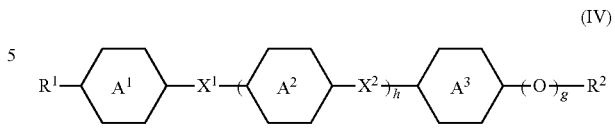
(IV)

wherein rings A¹, A² and A³ each independently represent a 1,4-phenylene group, a 1,4-cyclohexylene group, a 1,4-cyclohexylene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH₂— in these rings may be substituted with —S—, —N= or —O—;

X¹ and X² each independently represent a direct bond, —CH₂—CH₂—, —CF₂—CF₂—, —CH=CH—, —CF=CF—, —CH₂—O—, —O—CH₂—, —CF₂—O—, —O—CF₂— or —C≡C—;

R¹ and R² each independently represent an alkyl group having 1 to 6 carbon atoms or an alkenyl group having 2 to 6 carbon atoms; and g and h each independently represent 0 or 1.

8. An electro-optical display element, produced by sandwiching the liquid crystal composition according to claim 1 between a pair of substrates, with at least one of the substrates including thereon an electrode for applying a voltage to liquid crystal molecules, subsequently irradiating the liquid crystal composition with an energy radiation, and thereby polymerizing the polymerizable compound represented by the general formula (I) contained in the liquid crystal composition.

9. The liquid crystal composition according to claim 2, wherein in the general formula (I), Z1 and Z2 are groups different from Z6, and/or L1 and L2 are groups different from each other.

10. The liquid crystal composition according to claim 2, wherein Z3, Z4 and Z5 in the general formula (I) are each an ester bond.

11. The liquid crystal composition according to claim 3, wherein Z3, Z4 and Z5 in the general formula (I) are each an ester bond.

12. The liquid crystal composition according to claim 2, wherein the nematic liquid crystal composition having negative dielectric anisotropy (Δ∈) contains a liquid crystal compound represented by the following general formula (II):

[Chemical Formula 2]

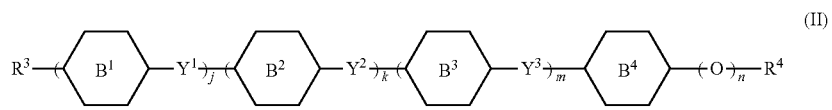

(II)

wherein rings B1, B2, B3 and B4 each independently represent a 1,4-phenylene group, a 1,4-cyclohexylene group, a 1,4-cyclohexylene group, a naphthalene-2,6-diyl group, a decahydronaphthalene-2,6-diyl group, a tetrahydronaphthalene-2,6-diyl group or a 2,5-indanylene ring; at least one hydrogen atom of these rings may be independently substituted with an alkyl group having 1 to 3 carbon atoms, an alkoxy group having 1 to 3 carbon atoms, a chlorine atom or a fluorine atom; —CH═ in these rings may be substituted with —N═; —CH2- in these rings may be substituted with —S—, —N═ or —O—; two or more hydrogen atoms of at least one of the rings B3 and B4 are substituted by substitutes which may be the same or different and are selected from chlorine, fluorine, —CF3-, —OCF3, and —OCF2H;

Y1, Y2 and Y3 each independently represent a direct bond, —CH2-CH2-, —CF2-CF2-, —CH═CH—, —CF═CF—, —CH2-O—, —O—CH2-, —CF2-O—, —O—CF2-, —CH2-S—, —S—CH2-, —CF2-S—, —S—CF2-, —O—CF2-C2H4-, —C2H4-CF2-O—, —CO—O—, —O—CO—, —CH2-CH2-CO—O—, —O—CO—CH2-CH2- or —C≡C—;

R3 and R4 each independently represent an alkyl group having 1 to 6 carbon atoms, or an alkenyl group having 2 to 6 carbon atoms;

j, k and m each independently represent 0 or 1, while j+k+m≥1; and n represents 0 or 1.

13. The liquid crystal composition according to claim 3, wherein the nematic liquid crystal composition having negative dielectric anisotropy (Δ∈) contains a liquid crystal compound represented by the following general formula (II):

[Chemical Formula 2]

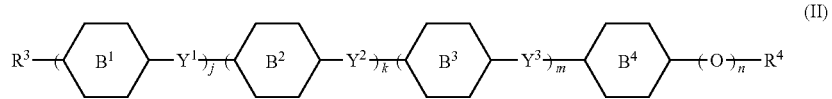

(II)

wherein rings B1, B2, B3 and B4 each independently represent a 1,4-phenylene group, a 1,4-cyclohexylene group, a 1,4-cyclohexylene group, a naphthalene-2,6-diyl group, a decahydronaphthalene-2,6-diyl group, a tetrahydronaphthalene-2,6-diyl group or a 2,5-indanylene ring; at least one hydrogen atom of these rings may be independently substituted with an alkyl group having 1 to 3 carbon atoms, an alkoxy group having 1 to 3 carbon atoms, a chlorine atom or a fluorine atom; —CH═ in these rings may be substituted with —N═; —CH2- in these rings may be substituted with —S—, —N═ or —O—; two or more hydrogen atoms of at least one of the rings B3 and B4 are substituted by substitutes which may be the same or different and are selected from chlorine, fluorine, —CF3-, —OCF3, and —OCF2H;

Y1, Y2 and Y3 each independently represent a direct bond, —CH2-CH2-, —CF2-CF2-, —CH═CH—, —CF═CF—, —CH2-O—, —O—CH2-, —CF2-O—, —O—CF2-, —CH2-S—, —S—CH2-, —CF2-S—, —S—CF2-, —O—CF2-C2H4-, —C2H4-CF2-O—, —CO—O—, —O—CO—, —CH2-CH2-CO—O—, —O—CO—CH2-CH2- or —C≡C—;

R3 and R4 each independently represent an alkyl group having 1 to 6 carbon atoms, or an alkenyl group having 2 to 6 carbon atoms;

j, k and m each independently represent 0 or 1, while j+k+m≥1; and n represents 0 or 1.

14. The liquid crystal composition according to claim 4, wherein the nematic liquid crystal composition having negative dielectric anisotropy (Δ∈) contains a liquid crystal compound represented by the following general formula (II):

[Chemical Formula 2]

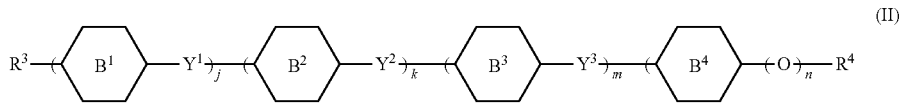

(II)

wherein rings B1, B2, B3 and B4 each independently represent a 1,4-phenylene group, a 1,4-cyclohexylene group, a 1,4-cyclohexylene group, a naphthalene-2,6-diyl group, a decahydronaphthalene-2,6-diyl group, a tetrahydronaphthalene-2,6-diyl group or a 2,5-indanylene ring; at least one hydrogen atom of these rings may be independently substituted with an alkyl group having 1 to 3 carbon atoms, an alkoxy group having 1 to 3 carbon atoms, a chlorine atom or a fluorine atom; —CH= in these rings may be substituted with —N=; —CH2- in these rings may be substituted with —S—, —N= or —O—; two or more hydrogen atoms of at least one of the rings B3 and B4 are substituted by substitutes which may be the same or different and are selected from chlorine, fluorine, —CF3-, —OCF3, and —OCF2H;

Y1, Y2 and Y3 each independently represent a direct bond, —CH2-CH2-, —CF2-CF2-, —CH=CH—, —CF=CF—, —CH2-O—, —O—CH2-, —CF2-O—, —O—CF2-, —CH2-S—, —S—CH2-, —CF2-S—, —S—CF2-, —O—CF2-C2H4-, —C2H4-CF2-O—, —CO—O—, —O—CO—, —CH2-CH2-CO—O—, —O—CO—CH2-CH2- or —C≡C—;

R3 and R4 each independently represent an alkyl group having 1 to 6 carbon atoms, or an alkenyl group having 2 to 6 carbon atoms;

j, k and m each independently represent 0 or 1, while j+k+m≥1; and n represents 0 or 1.

15. The liquid crystal composition according to claim 2, wherein the nematic liquid crystal composition having negative dielectric anisotropy (Δ∈) further contains a liquid crystal compound represented by the following general formula (IV):

[Chemical Formula 4]

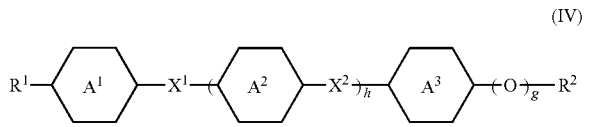

(IV)

wherein rings A1, A2 and A3 each independently represent a 1,4-phenylene group, a 1,4-cyclohexylene group, a 1,4-cyclohexylene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH2- in these rings may be substituted with —S—, —N= or —O—;

X1 and X2 each independently represent a direct bond, —CH2-CH2-, —CF2-CF2-, —CH=CH—, —CF=CF—, —CH2-O—, —O—CH2-, —CF2-O—, —O—CF2- or —C≡C—;

R1 and R2 each independently represent an alkyl group having 1 to 6 carbon atoms or an alkenyl group having 2 to 6 carbon atoms; and g and h each independently represent 0 or 1.

16. The liquid crystal composition according to claim 3, wherein the nematic liquid crystal composition having negative dielectric anisotropy (Δ∈) further contains a liquid crystal compound represented by the following general formula (IV):

[Chemical Formula 4]

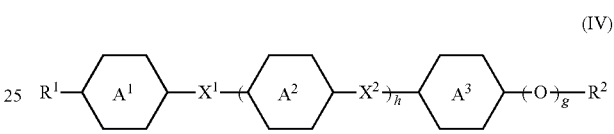

(IV)

wherein rings A1, A2 and A3 each independently represent a 1,4-phenylene group, a 1,4-cyclohexylene group, a 1,4-cyclohexylene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH2- in these rings may be substituted with —S—, —N= or —O—;

X1 and X2 each independently represent a direct bond, —CH2-CH2-, —CF2-CF2-, —CH=CH—, —CF=CF—, —CH2-O—, —O—CH2-, —CF2-O—, —O—CF2- or —C≡C—;

R1 and R2 each independently represent an alkyl group having 1 to 6 carbon atoms or an alkenyl group having 2 to 6 carbon atoms; and g and h each independently represent 0 or 1.

17. The liquid crystal composition according to claim 4, wherein the nematic liquid crystal composition having negative dielectric anisotropy (Δ∈) further contains a liquid crystal compound represented by the following general formula (IV):

[Chemical Formula 4]

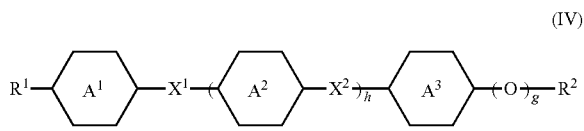

(IV)

wherein rings A1, A2 and A3 each independently represent a 1,4-phenylene group, a 1,4-cyclohexylene group, a 1,4-cyclohexylene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH2- in these rings may be substituted with —S—, —N= or —O—;

X1 and X2 each independently represent a direct bond, —CH2-CH2-, —CF2-CF2-, —CH=CH—, —CF=CF—, —CH2-O—, —O—CH2-, —CF2-O—, —O—CF2- or —C≡C—;

R1 and R2 each independently represent an alkyl group having 1 to 6 carbon atoms or an alkenyl group having 2 to 6 carbon atoms; and g and h each independently represent 0 or 1.

18. The liquid crystal composition according to claim 5, wherein the nematic liquid crystal composition having negative dielectric anisotropy (Δ∈) further contains a liquid crystal compound represented by the following general formula (IV):

[Chemical Formula 4]

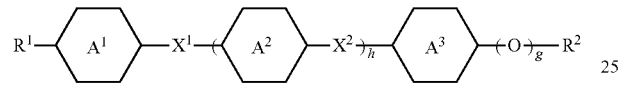

(IV)

wherein rings A1, A2 and A3 each independently represent a 1,4-phenylene group, a 1,4-cyclohexylene group, a 1,4-cyclohexylene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH2- in these rings may be substituted with —S—, —N= or —O—;

X1 and X2 each independently represent a direct bond, —CH2-CH2-, —CF2-CF2-, —CH=CH—, —CF=CF—, —CH2-O—, —O—CH2-, —CF2-O—, —O—CF2- or —C≡C—;

R1 and R2 each independently represent an alkyl group having 1 to 6 carbon atoms or an alkenyl group having 2 to 6 carbon atoms; and g and h each independently represent 0 or 1.

19. The liquid crystal composition according to claim 6, wherein the nematic liquid crystal composition having negative dielectric anisotropy (Δ∈) further contains a liquid crystal compound represented by the following general formula (IV):

[Chemical Formula 4]

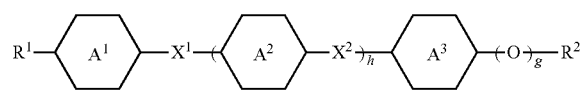

(IV)

wherein rings A1, A2 and A3 each independently represent a 1,4-phenylene group, a 1,4-cyclohexylene group, a 1,4-cyclohexylene group, a naphthalene-2,6-diyl group, a decahydronaphthalene-2,6-diyl group, or a tetrahydronaphthalene-2,6-diyl group; at least one hydrogen atom of these rings may be independently substituted with an alkyl group having 1 to 3 carbon atoms or an alkoxy group having 1 to 3 carbon atoms; —CH= in these rings may be substituted with —N=; —CH2- in these rings may be substituted with —S—, —N= or —O—;

X1 and X2 each independently represent a direct bond, —CH2-CH2-, —CF2-CF2-, —CH=CH—, —CF=CF—, —CH2-O—, —O—CH2-, —CF2-O—, —O—CF2- or —C≡C—;

R1 and R2 each independently represent an alkyl group having 1 to 6 carbon atoms or an alkenyl group having 2 to 6 carbon atoms; and g and h each independently represent 0 or 1.

20. An electro-optical display element, produced by sandwiching the liquid crystal composition according to claim 2 between a pair of substrates, with at least one of the substrates including thereon an electrode for applying a voltage to liquid crystal molecules, subsequently irradiating the liquid crystal composition with an energy radiation, and thereby polymerizing the polymerizable compound represented by the general formula (I) contained in the liquid crystal composition.

* * * * *